United States Patent
Tan et al.

(10) Patent No.: US 9,122,583 B2
(45) Date of Patent: Sep. 1, 2015

(54) MEMORY CONTROLLER AND MEMORY STORAGE DEVICE AND DATA WRITING METHOD

(75) Inventors: Kheng-Chong Tan, Miaoli (TW); Lai-Hock Chua, Miaoli (TW)

(73) Assignee: PHISON ELECTRONICS CORP., Miaoli (TW)

( * ) Notice: Subject to any disclaimer, the term of this patent is extended or adjusted under 35 U.S.C. 154(b) by 207 days.

(21) Appl. No.: 13/539,484

(22) Filed: Jul. 1, 2012

(65) Prior Publication Data

US 2013/0254461 A1    Sep. 26, 2013

(30) Foreign Application Priority Data

Mar. 20, 2012 (TW) .............................. 101109526 A

(51) Int. Cl.
*G06F 12/02* (2006.01)

(52) U.S. Cl.
CPC .... *G06F 12/0246* (2013.01); *G06F 2212/1016* (2013.01); *G06F 2212/1036* (2013.01); *G06F 2212/7203* (2013.01)

(58) Field of Classification Search
CPC ................... G06F 12/0246; G06F 2212/7203; G06F 2212/1036; G06F 2212/1016; G06F 2212/7211
See application file for complete search history.

(56) References Cited

U.S. PATENT DOCUMENTS

2011/0125954 A1*   5/2011   Yeh et al. ...................... 711/103
2011/0161565 A1*   6/2011   Chua et al. .................... 711/103

FOREIGN PATENT DOCUMENTS

TW        201118569        6/2011
TW        201122811        7/2011

OTHER PUBLICATIONS

"Office Action of Taiwan Counterpart Application", issued on May 8, 2014, p. 1-p. 23.

* cited by examiner

*Primary Examiner* — Cheng-Yuan Tseng
*Assistant Examiner* — Francisco Grullon
(74) *Attorney, Agent, or Firm* — Jianq Chyun IP Office

(57) ABSTRACT

A data writing method for a memory storage device having physical unit unions is provided, wherein each of the physical unit unions includes upper physical units and lower physical units. The method includes partitioning the physical unit unions into a storage area including a data area and a spare area; configuring logical units for mapping to the physical unit unions of the data area; and receiving update data from a host system. The method also includes: selecting several physical unit unions from the spare area as buffer physical unit unions; writing the update data only to a part of each of the buffer physical unit unions; and moving the update data from buffer physical unit unions to the storage area by using a copy procedure. Therefore, the time of performing a write command can be shorten and the lifespan of the memory storage device can be prolonged effectively.

18 Claims, 18 Drawing Sheets

| 202 | 204 | 206 |
|---|---|---|
| Lower physical addresses | Middle physical addresses | Upper physical addresses |
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

| Lower physical addresses 2002 | Upper physical addresses 2006 |
|---|---|
| 0 | 1 |
| 2 | 3 |
| ⋮ | ⋮ |
| 254 | 255 |

FIG. 13

MEMORY CONTROLLER AND MEMORY STORAGE DEVICE AND DATA WRITING METHOD

CROSS-REFERENCE TO RELATED APPLICATION

This application claims the priority benefit of Taiwan application serial no. 101109526, filed on Mar. 20, 2012. The entirety of the above-mentioned patent application is hereby incorporated by reference herein and made a part of this specification.

BACKGROUND

1. Technology Field

The present invention is directed to a data writing method for a rewritable non-volatile memory module, a memory controller and a memory storage device using the method.

2. Description of Related Art

Along with the widespread of digital cameras, cell phones, and MP3 in recently years, the consumers' demand for storage media has increased drastically. Since a rewritable non-volatile memory has the characteristics of non-volatility of data, low power consumption, small volume, non-mechanical structure, and fast reading and writing speed, the rewritable non-volatile memory is the most adaptable memory applied in a portable electronic product, e.g., a notebook computer. A solid state drive (SSD) is a storage apparatus which utilizes a flash memory as its storage medium. Therefore, the flash memory industry has become a very popular part of the electronic industry in recent years.

An NAND flash memory may be classified into a single level cell (SLC) NAND flash memory, a multi level cell (MLC) NAND flash memory, or a trinary level cell (TLC) NAND flash memory according to the number of bits which each memory cell thereof is capable of storing. Specifically, each memory cell in the SLC NAND flash memory can store one bit of data (i.e., "1" or "0"), each memory cell in the MLC NAND flash memory can store two bits of data, and each memory cell in the TLC NAND flash memory can store three bits of data.

In the NAND flash memory, a physical page is composed of several memory cells arranged on the same word line. Since each memory cell in the SLC NAND flash memory can store one bit of data, several memory cells arranged on the same word line in the SLC NAND flash memory correspond to one physical page.

Comparing with the SLC NAND flash memory, a floating gate storage layer in each memory cell of the MLC NAND flash memory can store two bits of data, and each storage state (i.e., "11," "10," "01," or "00") includes the least significant bit (LSB) and the most significant bit (MSB). For instance, the first bit from the left of the storage states is the LSB, and the second bit from the left of the storage states is the MSB. Accordingly, the several memory cells arranged on the same word line may constitute two physical pages, and herein, the physical pages constituted by the LSB and the MSB of the memory cells are referred to as lower physical pages and upper physical pages, respectively. Specially, a speed of writing data into the lower physical pages is faster than that of writing data into the upper physical pages, and when a program failure occurs in the process of programming the upper physical pages, the data stored in the lower physical pages may be lost.

Similarly, each memory cell in the TLC NAND flash memory can store three bits of data, and each storage state (i.e., "111," "110," "101," "100," "011," "010," "001," or "000") includes the first bit (i.e., the LSB), the second bit (i.e., the center significant bit, CSB), and the third bit (i.e., the MSB) from the left of the storage states. Accordingly, the several memory cells arranged on the same word line may constitute three physical pages, in which the physical pages constituted by the LSB, the CSB, and the MSB of the memory cells are referred to as lower physical pages, middle physical pages, and upper physical pages, respectively. In particular, while the several memory cells on the same word lines are programmed, only the lower physical pages can be programmed, or all of the lower, the center, and the upper physical pages need to be programmed before being read, or otherwise, the stored data may be lost. In addition, a number of times of erasing the flash memory are limited by a maximum threshold, and if the number of erasing times reaches the maximum threshold, no erasing operation is allowed any more. Besides, the lower physical pages, the middle physical pages and the upper physical pages are selected to be programmed, the maximum threshold of times of the number of erasing the flash memory will be lower, and namely, the lifespan of the flash memory will be shorter.

On the other hand, within a flash memory storage system, one physical block is constituted of a plurality of physical pages, and when writing data into the physical blocks, data must be written in turn according to the sequence of an arrangement of the physical pages. In addition, the written physical page has to be erased before it is used for writing data again, and one physical block is the minimum unit for erasing. Thus, typically, one physical block is the minimum unit for managing the flash memory. For example, if only a portion of pages in one physical block is updated, valid data in the physical block must be moved to another blank physical block before an erasing operation is performed on the physical block. Herein, the operation performed for moving valid data is referred to as a data merge operation.

In particular, in order to simultaneously perform a writing operation on multiple physical blocks in a parallel write mode to enhance the writing speed, multiple physical blocks are grouped into one physical unit group for management. In the flash memory storage system using one physical unit group as a management unit, the above-mentioned data merge operation is also performed by using the physical unit group as the unit. In particular, if data of only a portion of pages in one physical unit group is updated, the valid data in the physical unit group must be moved to another blank physical unit group before the erasing operation is performed on the physical unit group. Since one physical unit group is constituted of a plurality of physical blocks, it takes more time to perform the data merge operation by using the unit of one physical unit group, and the time for performing the data writing operation will be significantly increased.

Besides, in the flash memory storage system using the unit of one physical unit group, if a host system frequently writes small-volume data (i.e. a volume of the data is smaller than a capacity of one physical unit group), the number of times of erasing the physical blocks will be meaninglessly increased. In particular, if the host system only updates the data in a portion of the physical blocks in the physical unit group, in order to perform the aforementioned data merge operation, the data in the un-updated physical blocks still requires to be moved to another physical unit group so that the erasing operation is performed thereon, and thus, the un-updated physical blocks will also be consumed.

In light of the foregoing, how to prolong the lifespan of the flash memory module and to keep the writing speed of the flash memory module at the same time is one of the major subjects for persons skilled in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, in an exemplary embodiment of the present invention, a data writing method, a memory controller and a memory storage device using the same capable of effectively enhance the speed of writing data and prolong the lifespan of the memory storage device.

According to an exemplary embodiment of the present invention, a data writing method for a memory storage device is provided. The memory storage device includes a rewritable non-volatile memory module, and the rewritable non-volatile memory module has a plurality of physical unit unions. Each of the physical unit unions has a plurality of physical unit sets, and each physical unit set at least has an upper physical unit and a lower physical unit. A speed of writing data into the lower physical units is faster than a speed of writing data into the upper physical units. The data writing method includes at least partitioning the physical unit unions into a storage area having a data area and a spare area and configuring a plurality of logical units for mapping to the physical unit sets of the data area, in which each of the logical units has a plurality of logical pages. The data writing method also includes receiving first update data from a host system, wherein the first update data is to be written into at least one logical page of a first logical unit among the logical units. The data writing method further includes getting multiple physical unit unions from the physical unit unions of the spare area and independently serve the gotten physical unit sets as a plurality of buffer physical unit unions corresponding to the first logical unit, using only a portion of the buffer physical unit unions corresponding to the first logical unit to write the first update data; and performing a copy procedure to move the first update data from the buffer physical unit sets corresponding to the first logical unit to the storage area, wherein a speed of the written portion is faster than a speed of the other portion of the buffer physical unit sets.

According to another embodiment of the present invention, a memory storage device including a rewritable non-volatile memory module, a connector, and a memory controller is provided. The rewritable non-volatile memory module has a plurality of physical unit unions, each of the physical unit unions has a plurality of physical unit sets, and each of the physical unit sets at least has an upper physical unit and a lower physical unit. A speed of writing data into the lower physical units is faster than a speed of writing data into the upper physical units. The connector is coupled to a host system. The memory controller is coupled to the connector and the rewritable non-volatile memory module. The memory controller at least partitions the physical unit unions into a storage area, and the storage area includes a data area and a spare area. The memory controller also configures a plurality of logical units for mapping to the physical unit unions of the data area, and each logical unit has a plurality of logical pages. The memory controller further receives first update data from the host system, and the first update data is to be written into at least one logical page of a first logical unit among the logical units. Besides, the memory controller gets multiple physical unit unions from the physical unit unions in the spare area and independently serves the gotten physical unit sets as a plurality of buffer physical unit unions corresponding to the first logical unit. The memory controller uses only a portion the buffer physical unit unions corresponding to the first logical unit to write the first update data, wherein a writing speed of the written portion is faster than a speed of the other portion of the buffer physical unit unions. In addition, the memory controller performs a copy procedure to move the first update data from the buffer physical unit unions corresponding to the first logical unit to the storage area.

According to still another exemplary embodiment of the present invention, a memory controller is provided for controlling a rewritable non-volatile memory module. The rewritable non-volatile memory module has a plurality of physical unit unions. Each of the physical unit unions has a plurality of physical unit sets, and each physical unit set at least has an upper physical unit and a lower physical unit. A speed of writing data into the lower physical units is faster than a speed of writing data into the upper physical units. The memory controller includes a host system interface, a memory interface, and a memory management circuit. The host interface is coupled to a host system. The memory interface is coupled to the rewritable non-volatile memory module. The memory management circuit is coupled to the host interface and the memory interface and at least partitions the physical unit unions into a storage area. The storage area includes a data area and a spare area. The memory management circuit configures a plurality of logical units for mapping to the physical unit unions of the data area, and each of the logical units has a plurality of logical pages. The memory management circuit also receives first update data from the host system, wherein the first update data is to be written into at least one logical page of a first logical unit among the logical units. The memory management circuit also gets multiple physical unit unions from the physical unit unions in the spare area to independently serve the physical unit sets as a plurality of buffer physical unit unions corresponding to the first logical unit and uses only a portion of the buffer physical unit unions corresponding to the first logical unit to write the first update data, wherein a writing speed of the written portion is faster than a speed of another portion of the buffer physical unit unions. The memory management circuit performs a copy procedure to move the first update data from the buffer physical unit unions corresponding to the first logical unit to the storage area In light of the foregoing, in the data writing method, the memory controller and the memory storage device provided by an exemplary embodiment of the present invention, only the portion of the buffer physical units having the higher writing speed is used to write data, and thus, the lifespan of the rewritable non-volatile memory module can be prolonged. On the other hand, when writing data into the buffer physical unit unions, the copy procedure is also performed for writing data to the data area at the same time, such that the speed of writing data can be enhanced.

In order to make the aforementioned features and advantages of the present invention more comprehensible, embodiments accompanying figures are described in detail below.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

FIG. 13 is a schematic diagram illustrating an example of physical blocks of a MLC NAND flash memory module according to the second exemplary embodiment.

DESCRIPTION OF EMBODIMENTS

Figure 1A:
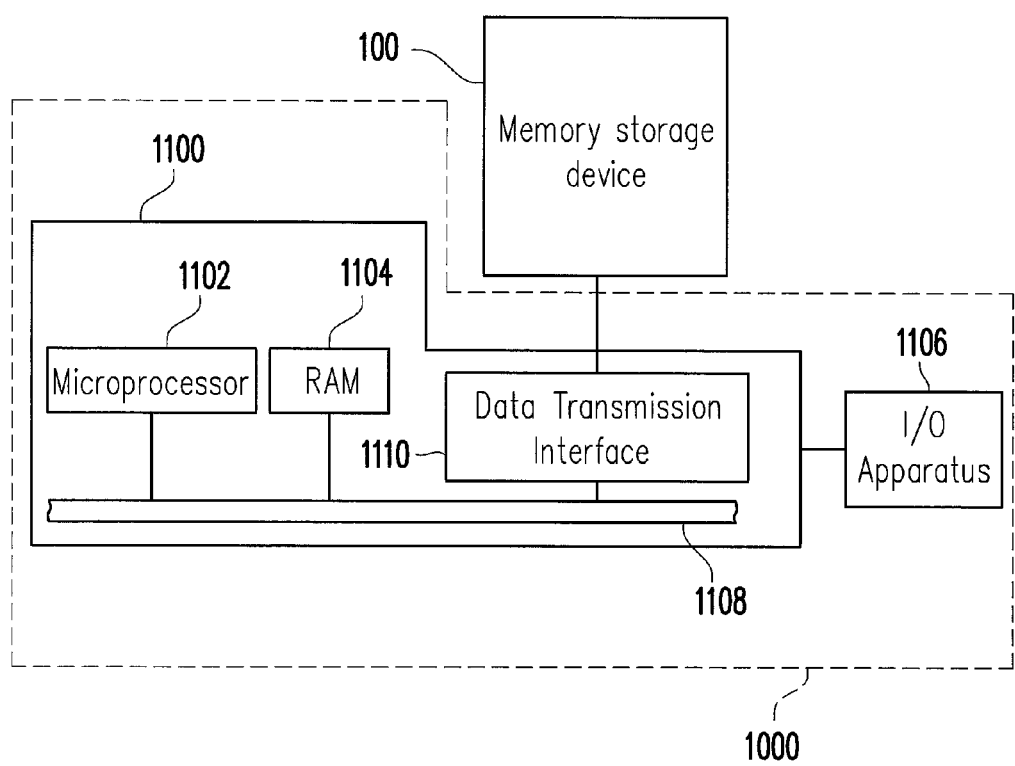
FIG. 1A illustrates a host system and a memory storage device according to a first exemplary embodiment.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In this specification, so called physical units are also referred to as physical pages, so called physical unit unions are also referred to as physical blocks, and so called physical unit sets are also referred to as physical page sets. Herein, a physical unit union is the minimum unit for erasing. Besides, a plurality of physical blocks mapped to a logical unit may be referred to as a physical unit group. In addition, an upper physical unit is also referred to as an upper physical page, a center physical unit is also referred to as a middle physical page, and a lower physical unit is also referred to as a lower physical page. However, in other embodiments, the physical unit may be one or more other electrical devices having rewritable and non-volatile features, such as a physical sector, and the invention is not limited thereto.

First Exemplary Embodiment

Typically, a memory storage device (i.e., a memory storage system) includes a rewritable non-volatile memory module and a controller (i.e., a control circuit). The memory storage device is usually used together with a host system, such that the host system can write data into or read data from the memory storage device.

FIG. 1A illustrates a host system and a memory storage device according to a first exemplary embodiment.

Figure 1B:
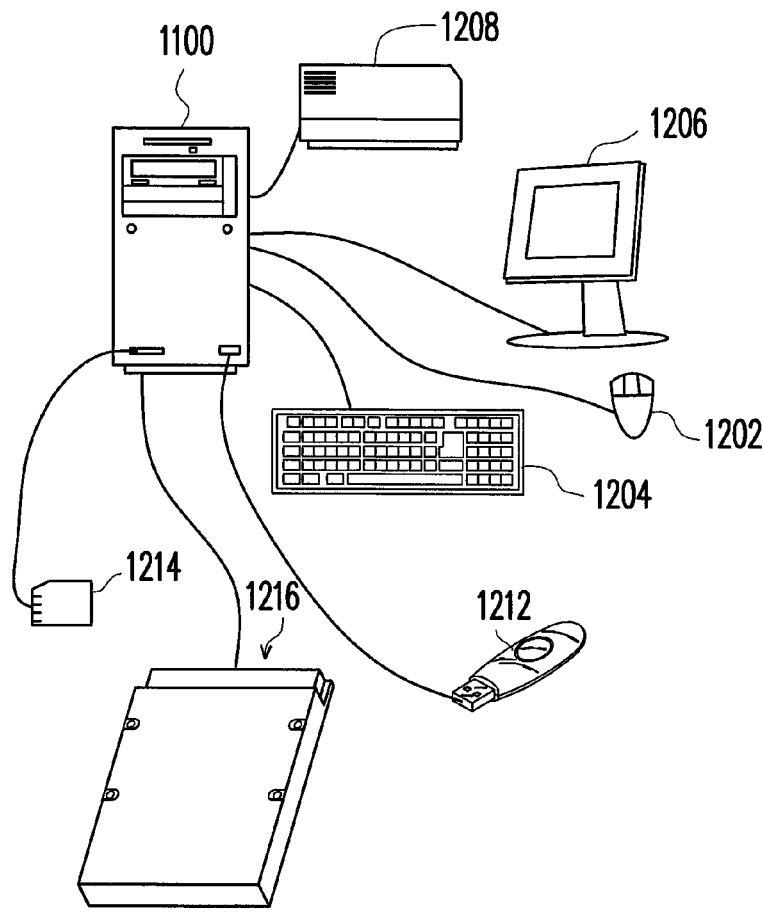
FIG. 1B is a schematic diagram illustrating a computer, an input/output (I/O) device, and a memory storage device according to the first exemplary embodiment.

With reference to FIG. 1A, a host system 1000 in most cases includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that, the devices depicted in FIG. 1B is not construed as limitations to the I/O device 1106, and the I/O device 1106 may further include other devices.

In the embodiments of the present invention, the memory storage device 100 is coupled to other devices of the host system 1000 through the data transmission interface 1110. By using the microprocessor 1102, the RAM 1104, and the I/O device 1106, data can be written into or read from the memory storage device 100. For instance, the memory storage device 100 may be a rewritable non-volatile memory storage device, such as a flash drive 1212, a memory card 1214, or a solid state drive (SSD) 1216 as shown in FIG. 1B.

Figure 1C:
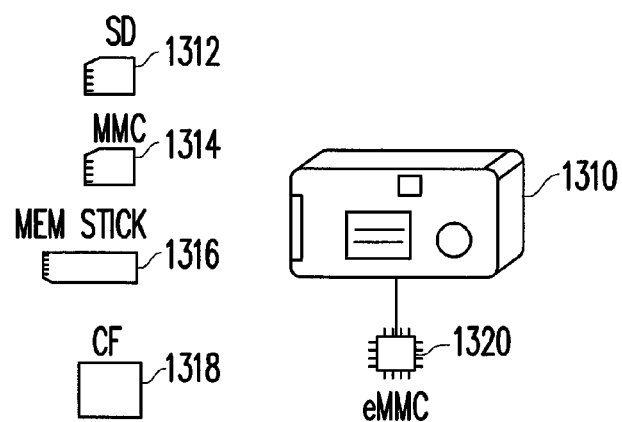
FIG. 1C is a schematic diagram illustrating a host system and a memory storage device according to the exemplary embodiment.

Generally, the host system 1000 can substantially be any system used together with the memory storage device 100 for storing data. Even though the host system 1000 is described as a computer system in the present exemplary embodiment, the host system 1000 in another exemplary embodiment may be a digital camera, a video camera, a communication device, an audio player, a video player, and so on. For instance, if the host system is a digital camera (video camera) 1310, the rewritable non-volatile memory storage device is an SD card 1312, an MMC card 1314, a memory stick 1316, a CF card 1318 or an embedded storage apparatus 1320 (as shown in FIG. 1C). The embedded storage device 1320 includes an embedded MMC (eMMC). It should be noted that the eMMC is directly coupled to a substrate of the host system.

Figure 2:
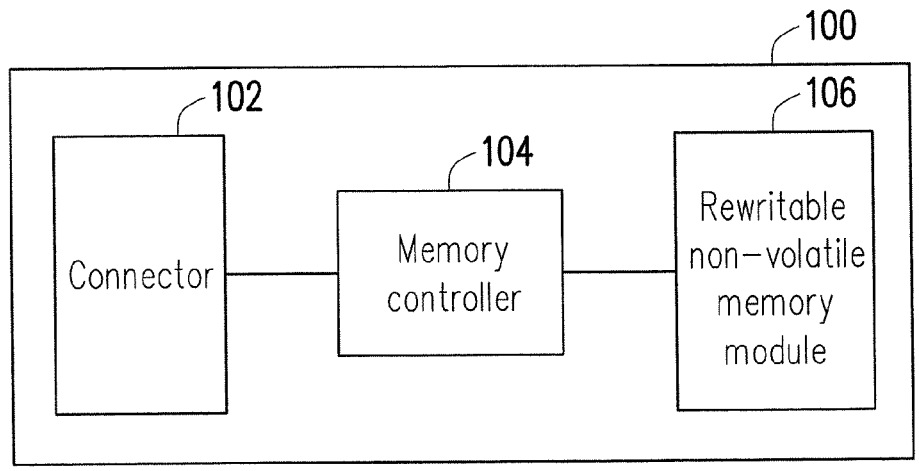
FIG. 2 is a schematic block diagram illustrating the memory storage device depicted in FIG. 1A.

FIG. 2 is a schematic block diagram illustrating the memory storage device depicted in FIG. 1A.

With reference to FIG. 2, the memory storage device 100 includes a connector 102, a memory controller 104, and a rewritable non-volatile memory module 106.

In the present exemplary embodiment, the connector 102 complies with the serial advanced technology attachment (SATA) standard. However, the present invention is not limited thereto, and the connector 102 may also comply with the Institute of Electrical and Electronic Engineers (IEEE) 1394 standard, the parallel advanced technology attachment (PATA) standard, the peripheral component interconnect express (PCI express) standard, the universal serial bus (USB) standard, the secure digital (SD) standard, the memory sick (MS) standard, the multi media card (MMC) standard, the compact flash (CF) standard, the integrated device electronics (IDE) standard, or other suitable standards.

The memory controller 104 is configured for executing a plurality of logic gates or control instructions implemented in a form of hardware or firmware and performing various data operations in the rewritable non-volatile memory module 106 according to a command of the host system 1000, such as data writing, reading, erasing, merging, and so on.

The rewritable non-volatile memory module 106 is coupled to the memory controller 104 and provided with a plurality of physical blocks for storing data written by the host system 1000.

In the present exemplary embodiment, each of the physical blocks has a plurality of physical page sets, and each of the physical page sets includes at least one physical page constituted by memory cells arranged on the same word line. The physical pages belonging to the same physical block must be erased simultaneously. In more detail, the physical block is the smallest unit for erasing. Namely, each of the physical blocks has the least number of memory cells for being erased altogether.

Each physical page usually includes a data bit area and a redundancy bit area. The data bit area is used for storing user data, and the redundancy bit area is used for storing system data (e.g., error checking and correcting (ECC) codes). In the present exemplary embodiment, each of the physical blocks is constituted by 258 physical pages, and a capacity of each of the physical pages is 8 kilobytes (KB). Nevertheless, it should be understood that the present invention is not limited thereto.

In the present exemplary embodiment, the rewritable non-volatile memory module 106 is a trinary level cell (TLC) NAND flash memory module. However, it should be understood that the rewritable non-volatile memory module 106 is not limited to the trinary level cell (TLC) NAND flash memory module. In another embodiment of the present invention, the rewritable non-volatile memory module 106 may also be four-level, multi-level or any other type of memory module having the same characteristics.

Figure 3A:
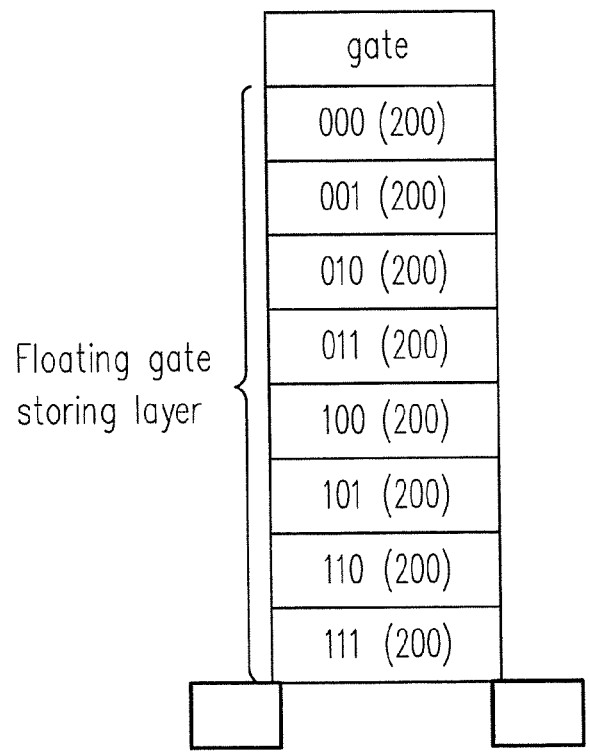
FIG. 3A and FIG. 3B are schematic diagrams illustrating a memory cell storage structure and a physical block according to the first exemplary embodiment.
Figures 3B, 4:
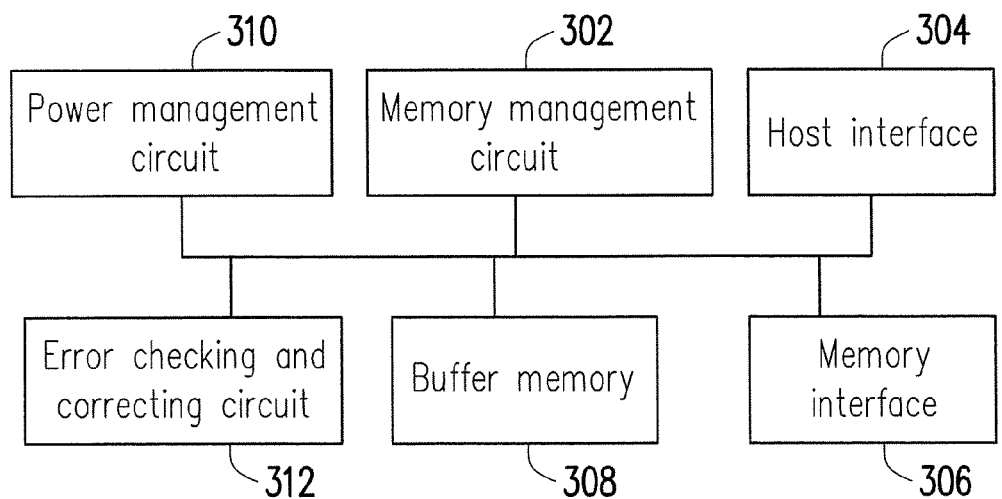
FIG. 4 is a schematic block diagram illustrating a memory controller according to the first exemplary embodiment.

FIG. 3A and FIG. 3B are schematic diagrams illustrating a memory cell storage structure and a physical block according to the first exemplary embodiment.

With reference to FIG. 3A, each storage state 200 of each memory cell in the rewritable non-volatile memory module 106 can be identified as "111," "110," "101," "100," "011," "010," "001," or "000" (as shown in FIG. 3A), in which the first bit from the left is the LSB, the second bit from the left is the CSB, and the third bit from the left is the MSB. Additionally, several memory cells arranged on the same word line may constitute three physical pages, and the physical pages constituted by the LSBs, the CSBs, and the MSBs of the memory cells are referred to as lower physical pages, middle physical pages, and upper physical pages, respectively.

Referring to FIG. 3B, a physical block is composed of a plurality of physical page sets, each of which includes a lower physical page, a middle physical page, and an upper physical page that are constituted by several memory cells arranged on the same word line. For instance, in one physical block, the $0^{th}$ physical page belonging to the lower physical page 202, the $1^{st}$ physical page belonging to the middle physical page 204, and the $2^{nd}$ physical page belonging to the upper physical page 206 are deemed as a physical page set. Similarly, the $3^{rd}$, $4^{th}$ and $5^{th}$ physical pages are deemed as one physical page set, and so are other physical pages.

FIG. 4 is a schematic block diagram illustrating a memory controller according to the first exemplary embodiment. It should be understood that the memory controller depicted in FIG. 4 is merely exemplary and the present invention is not limited thereto.

With reference to FIG. 4, the memory controller 104 includes a memory management circuit 302, a host interface 304, a memory interface 306, a buffer memory 308, a power management circuit 310, and an error checking and correcting (ECC) circuit 312.

The memory management circuit 302 is configured for controlling the whole operation of the memory controller 104. Particularly, the memory management circuit 302 has a plurality of control instructions, and when the memory storage device 100 is operated, the control instructions are executed to perform an operation, such as data writing, data reading, data erasing, and so on.

In the present exemplary embodiment, the control instructions of the memory management circuit 302 are implemented in a firmware form. For example, the memory management circuit 302 has a microprocessor unit (not shown) and a read-only memory (ROM, not shown), and the control instructions are burned in the ROM. When the memory storage device 100 is operated, the control instructions are executed by the microprocessor unit to perform an operation, such as data writing, data reading, data erasing, and so on.

In another exemplary embodiment of the present invention, the control instructions of the memory management circuit 302 are stored in a specific area (for instance, the system area of the memory module dedicated to storing system data) of the rewritable non-volatile memory module 106 in a form of program codes. Moreover, the memory management circuit 302 includes a microprocessor unit, a read-only memory (ROM) and a random access memory (RAM), which are not shown. In particular, the ROM has a boot code, and when the memory controller 104 is enabled, the microprocessor unit first executes the boot code to load the control instructions from the rewritable non-volatile memory module 106 into the RAM of the memory management circuit 302. The microprocessor unit then executes the control instructions to perform an operation, such as data writing, data reading, data erasing, and so on.

Furthermore, in another exemplary embodiment of the present invention, the control instructions of the memory management circuit 302 are implemented in a hardware form. For example, the memory management circuit 302 includes a micro controller, memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the micro controller. Herein, the memory cell management circuit is configured for managing the physical blocks of the rewritable non-volatile memory module 106, the memory writing circuit is configured for giving a write command to the rewritable non-volatile memory module 106 in order to write data into the rewritable non-volatile memory module 106, the memory reading circuit is configured for giving a read command to the rewritable non-volatile memory module 106 in order to read data from the rewritable non-volatile memory module 106, the memory erasing circuit is adopted for giving an erase command to the rewritable non-volatile memory module 106 in order to erase data from the rewritable non-volatile memory module 106, and the data processing circuit is configured for processing data to be written into or to be read from the rewritable non-volatile memory module 106.

The host interface 304 is coupled to the memory management circuit 302 and configured for receiving and identifying the commands and data transmitted from the host system 1000. In the present exemplary embodiment, the host interface 304 complies with the SATA standard. However, the present invention is not limited thereto, and the host interface 304 can also comply with the PATA standard, the IEEE 1394 standard, the PCI Express standard, the USB standard, the SD standard, the MS standard, the MMC standard, the CF standard, the IDE standard, or any other appropriate data transmission standard.

The memory interface 306 is coupled to the memory management circuit 302 and used for accessing the rewritable non-volatile memory module 106. Namely, the data to be written into the rewritable non-volatile memory module 106 is converted to an acceptable format for the rewritable non-volatile memory module 106 by the memory interface 306.

The buffer memory 308 is coupled to the memory management circuit 302 and configured for temporarily storing the commands and data from the host system 1000 or data from the rewritable non-volatile memory module 106. For instance, the buffer memory 302 may be a static random access memory (SRAM), a dynamic random access memory (DRAM), and so forth.

The power management circuit 310 is coupled to the memory management circuit 302 and configured for controlling the power of the memory storage device 100.

The ECC circuit 312 is coupled to the memory management circuit 302 and configured for executing an error correcting procedure to ensure data accuracy. Specifically, when the host interface 304 receives a write command from the host system 1000, the ECC circuit 312 generates an ECC code for write data (i.e., update data) corresponding to the write command, and the memory management circuit 302 writes the update data and the corresponding ECC code into the rewritable non-volatile memory module 106. Subsequently, when the memory management circuit 302 reads data from the rewritable non-volatile memory module 106, the memory management circuit 302 simultaneously reads the ECC code corresponding to such read data, and the ECC circuit 312 executes the error correcting procedure for such read data based on the ECC code.

Figure 5:
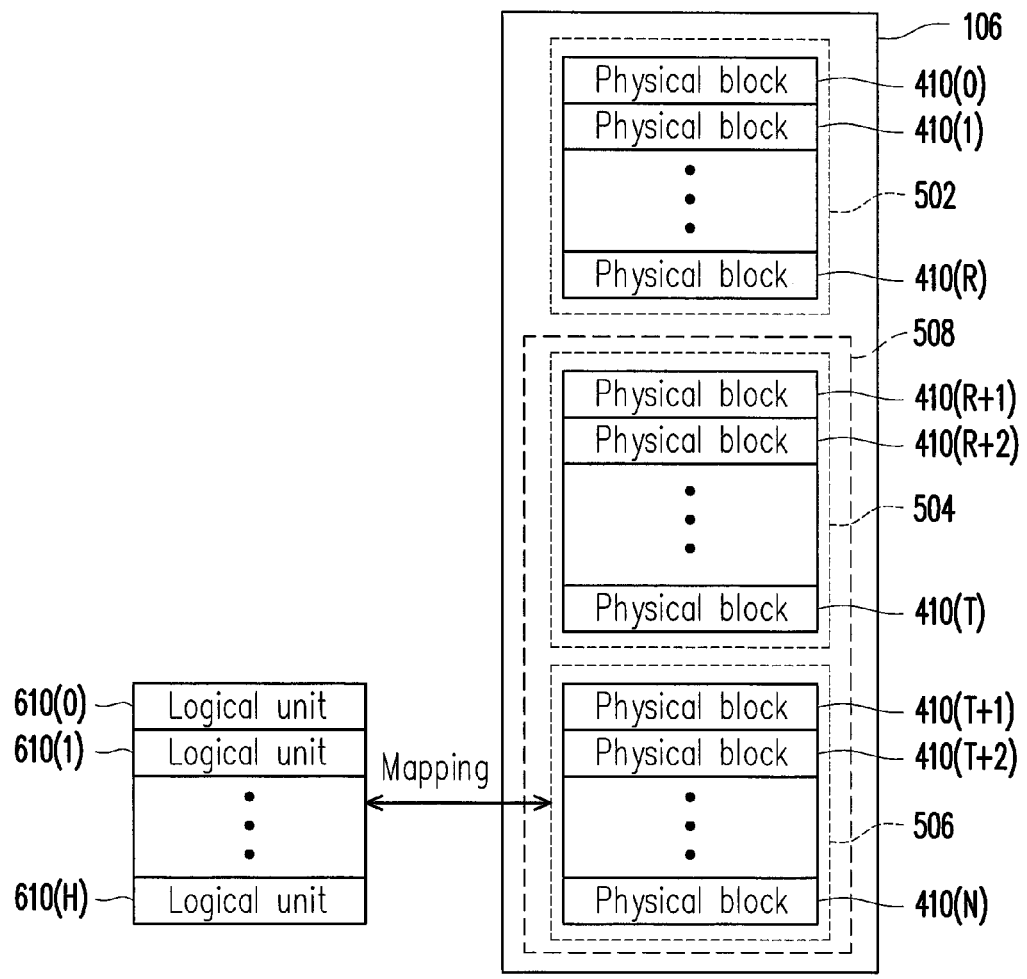
FIG. 5 is a schematic diagram illustrating an example of managing physical blocks of a rewritable non-volatile memory module according to the first exemplary embodiment.

FIG. 5 is a schematic diagram illustrating an example of managing physical blocks of a rewritable non-volatile memory module according to the first exemplary embodiment.

Referring to FIG. 5, the rewritable non-volatile memory module 106 has physical blocks 410(0)~410(N), and the memory management circuit 302 of the memory controller 104 partitions the physical blocks 410(0)~410(N) into multiple areas, such as a replacement area 502, a spare area 504, and a data area 506 and a storage area 508. In another exemplary embodiment, the replacement area 502 and the spare area 504 may also share an area containing invalid data.

The physical blocks of the replacement area 502 are used in a bad physical block replacement procedure for replacing damaged physical blocks. Particularly, if there are still normal physical blocks in the replacement area 502, and a physical block in the data area 506 or the spare area 504 is damaged, the memory management circuit 302 gets a normal physical block from the replacement area 502 to replace the damaged physical block.

Physical blocks of the spare area 504 are configured for temporarily storing data written by the host system 1000. The detailed data writing method will be described hereinafter with reference to the drawings. It should be mentioned that in the present exemplary embodiment, the memory management circuit 302 operates the physical blocks in the spare area 504 by a single-page mode. To be specific, in the single-page mode, only the lower physical pages are used for storing data. That is, in the single-page mode, the memory management circuit 302 only performs the operation, such as data writing, reading, and erasing on the lower physical pages. In another exemplary embodiment, the single-page mode is applied for storing only one bit of data in each memory cell of one physical page. A multi-page mode is configured for storing multiple bits of data in each memory cell of one physical.

Physical blocks of the data area 506 are configured for storing data written by the host system 1000. Particularly, the memory management circuit 302 converts logical access addresses accessed by the host system 1000 into corresponding logical units and corresponding logical pages and maps the logical pages of the logical units to the physical pages of the physical blocks in the data area. Namely, the physical blocks in the data area 506 are deemed as used physical blocks (e.g., stored data written by the host system 1000). For example, the memory management circuit 302 uses a logical unit-physical block mapping table for recording the mapping relationship between the logical units and the physical blocks in the data area 506, in which the logical pages in the logical units correspond in turn to the physical pages of the physical blocks mapped thereto. For instance, in the present exemplary embodiment, logical blocks 610(0)~610(H) are mapped to the physical blocks in the data area 506, in which a capacity of one of the logical units is equal to a capacity of two of the physical blocks. However, in another exemplary embodiment, a capacity of one of the logical units may also be equal to a capacity of one or more than three physical blocks, but the present invention is not limited thereto. The number of physical blocks in the data area 506 is highly associated with the capacity of the memory storage device 100, in which a capacity amount of all the physical blocks 410(T+1)~410(N) must be larger than a capacity amount of the logical units 610(0)~610(H). However, in another exemplary embodiment, the memory management circuit 302 may uses the logical block-physical page mapping table for recording the mapping relationship between the logical units and the physical pages in the physical blocks in the data area 506. The present invention is not intent to limit the mapping relationship between the logical units and the physical pages or the physical blocks.

In the present exemplary embodiment, the memory management circuit 302 operates the physical blocks in the data area 506 by a multi-page mode. In particular, in the multi-page mode, the lower physical pages, the middle physical pages and the upper physical pages are all configured for storing data. It should be mentioned that in the present exemplary embodiment, when using the multi-page mode to operate the physical pages of the data area, all physical pages in the same physical page set require to be programmed before they are read. Particularly, when data is stored in the lower physical page and the middle physical page of one physical block, and no data is stored in the upper physical page, the memory management circuit 302 can not perform the reading operation on the lower page unit and center page unit. Besides, when data is already stored in all the lower page, the center page and the upper page of one physical block, the memory management circuit 302 then can perform the reading operation on the lower physical page, the middle physical page and upper physical page of such physical block.

Further, comparing with the physical blocks operated by the single-page mode, the physical blocks operated in the multi-page mode have the shorter lifespan. Specifically, the number of times of writing data into or erasing data from each physical block is limited, and therefore, when the number of times of writing data into a certain physical block exceeds a threshold, the physical block will be damaged, and no data can be written any longer. Herein, a threshold of the physical blocks operated in the multi-page manner is lower than a threshold of the physical blocks operated in the single-page mode.

In view of the above, the physical blocks of the spare area 504 and the physical blocks of the data area 506 are operated by using different modes and accordingly, once one physical block is partitioned into the spare area 504 or the data area 506, such physical block can merely be used in the specific partitioned area. Namely, the memory management circuit 302 separately operates the physical blocks of the data area 506 and the physical blocks of the spare area 504 rather than collectively operates these physical blocks in different areas. For instance, once one physical block is partitioned into the spare area 504, the memory management circuit 302 operates such physical block by a single-page mode in the spare area 504 until such physical block is damaged, or alternatively, once one physical block is partitioned into the data area 506, the memory management circuit 302 operates such physical block by the multi-page mode in the data area 506 until the physical block no longer belongs to the data area 506.

In the present exemplary embodiment, when the host system 1000 is about to store data to a logical unit, the memory management circuit 302 gets multiple physical blocks from the physical blocks in the spare area 504, serve the gotten physical blocks independently as buffer physical blocks corresponding to the logical unit and temporarily writes the data to be stored by the host system 1000 to a portion of these buffer physical blocks, that data can be written into with a higher speed, to shorten the time for executing a write command.

Figure 6:
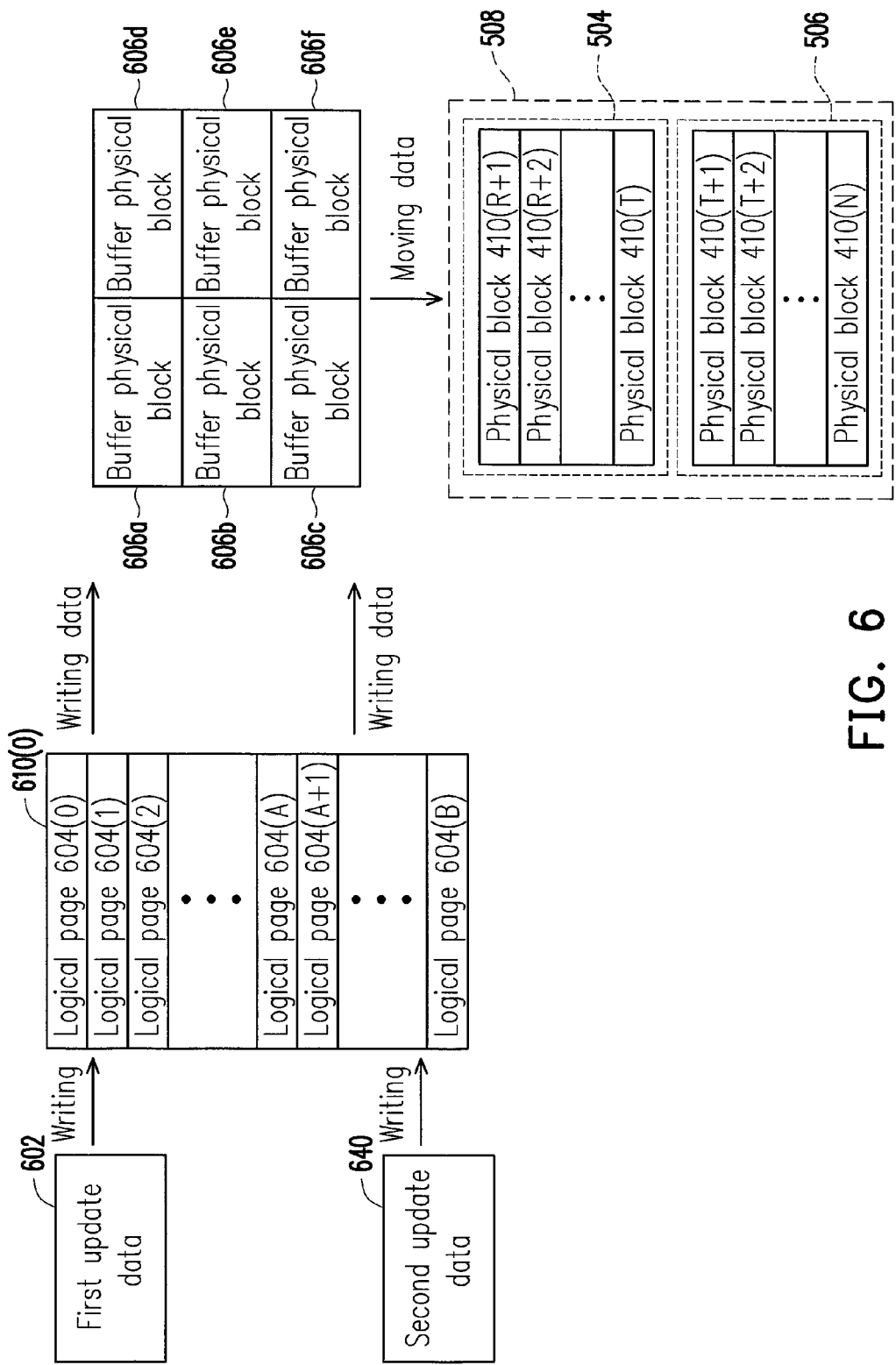
FIG. 6 is a diagram illustrating an example of writing an update data according to the first exemplary embodiment.

FIG. 6 is a diagram illustrating an example of writing an update data according to the first exemplary embodiment.

Referring to FIG. 6, the memory management circuit 302 receives data to be stored by the host system 1000 (hereinafter as first update data 602). For example, the first update data 602 is to be written into at least one logical page (e.g. logical pages 604(0)~604(A)) of the logical unit 610(0). However, the present invention is not intent to limit the logical unit and the logical page where the first update data 602 is to be written to and not intent to limit the size and the content of the first update data 602.

In this example, the memory management circuit 302 gets multiple physical blocks form the spare area 504, serves the gotten physical blocks as buffer physical blocks 606a~606f corresponding to the logical unit 610(0) and uses a portion of the buffer physical blocks 606a~606f to write the first update data 602. Herein, the writing speed of the portion of the buffer physical blocks 606a~606f for writing data is higher than the writing speed for the other portion of the physical blocks. For example, in the present exemplary embodiment, the memory management circuit 302 uses the lower pages of the buffer physical blocks for writing data, and the writing speed of the lower physical is faster than the writing speeds of the middle physical pages and the upper physical pages. In other exemplary embodiments, the memory management circuit 302 may also uses the lower physical pages and the middle physical pages of the buffer physical blocks for writing data. The present invention is not intent to limit the portion of the buffer physical blocks used for writing data. For example, each logical page of the logical unit 610(0) corresponds to one lower physical page of the buffer physical blocks 606a~606f. That is, a storage space amount of the buffer physical blocks 606a~606f is equal to a capacity of the logical unit 610(0).

In the present exemplary embodiment, one logical unit corresponds to two physical blocks in the data area 506, and the upper physical pages, the middle physical pages and the lower physical pages of the physical blocks in each data area 506 are used for storing data. Therefore, the capacity of one logical unit is equal to the storage space amount of the lower physical pages of 6 buffer physical blocks. However, in another exemplary embodiment of the present invention, the capacity of one logical unit may also be equal to the storage space amount of the lower physical pages of other number of buffer physical blocks, and the present invention is not limited thereto.

It should be mentioned that in the present exemplary embodiment, the buffer physical blocks 606a~606f are independently served as the buffer physical blocks of a first logical unit 610(0). That is, the buffer physical blocks that have been assigned to the logical units will not be shared. For instance, when the host system 1000 is to store data in the logical unit 610(1), the memory management circuit 302 gets the rest of the physical blocks from the spare area 504 as the buffer physical blocks of the logical unit 610(1).

After the first update data 602 is written into the buffer physical blocks 606a~606f, the memory management circuit 302 notifies the host system 1000 that the writing operation is completed by replying a confirmation message thereto. Since the speed of writing data into the lower physical pages of the physical blocks is faster, the time for executing the command of writing data can be effectively shortened. Afterwards, the memory management circuit 302 utilizes an appropriate timing to correctly write the update data temporarily stored in the buffer physical blocks into the physical blocks in the storage area 508. For example, the memory management circuit 302 performs a copy procedure to move the first update data 602 from the buffer physical blocks 606a~606f to the storage area 508. Herein, such copy procedure is referred to at least reading data from one page in the rewritable non-volatile memory module 106 to a buffer memory (not shown) of the rewritable non-volatile memory module 106 and then writing data to another page in the rewritable non-volatile memory module 106. For example, the copy procedure is performed by applying a copyback command, and the copyback command is a command configured for moving data between physical blocks within a same block plane.

It is to be mentioned that since the memory management circuit 302 replies the confirmation message to the host system 1000 after writing the first update data 602 to the buffer physical blocks 606a~606f, the memory management circuit 302 may perform the copy procedure to move the first update data 602 from the buffer physical blocks 606a~606f to the data area 506 in the meantime when receiving a next data (hereinafter as second update data 640) to be stored by the host system 1000. For example, the second update data is to be written into logical pages 604(A+1)~604(B), and, in the meantime when writing the second update data 640 to the buffer physical blocks 606a~606f, the memory management circuit 302 performs the copy procedure to move the first update data 602 from the buffer physical blocks 606a~606f to the data area 506. Thereby, the performance of the memory storage device can be significantly enhanced.

Figure 7:
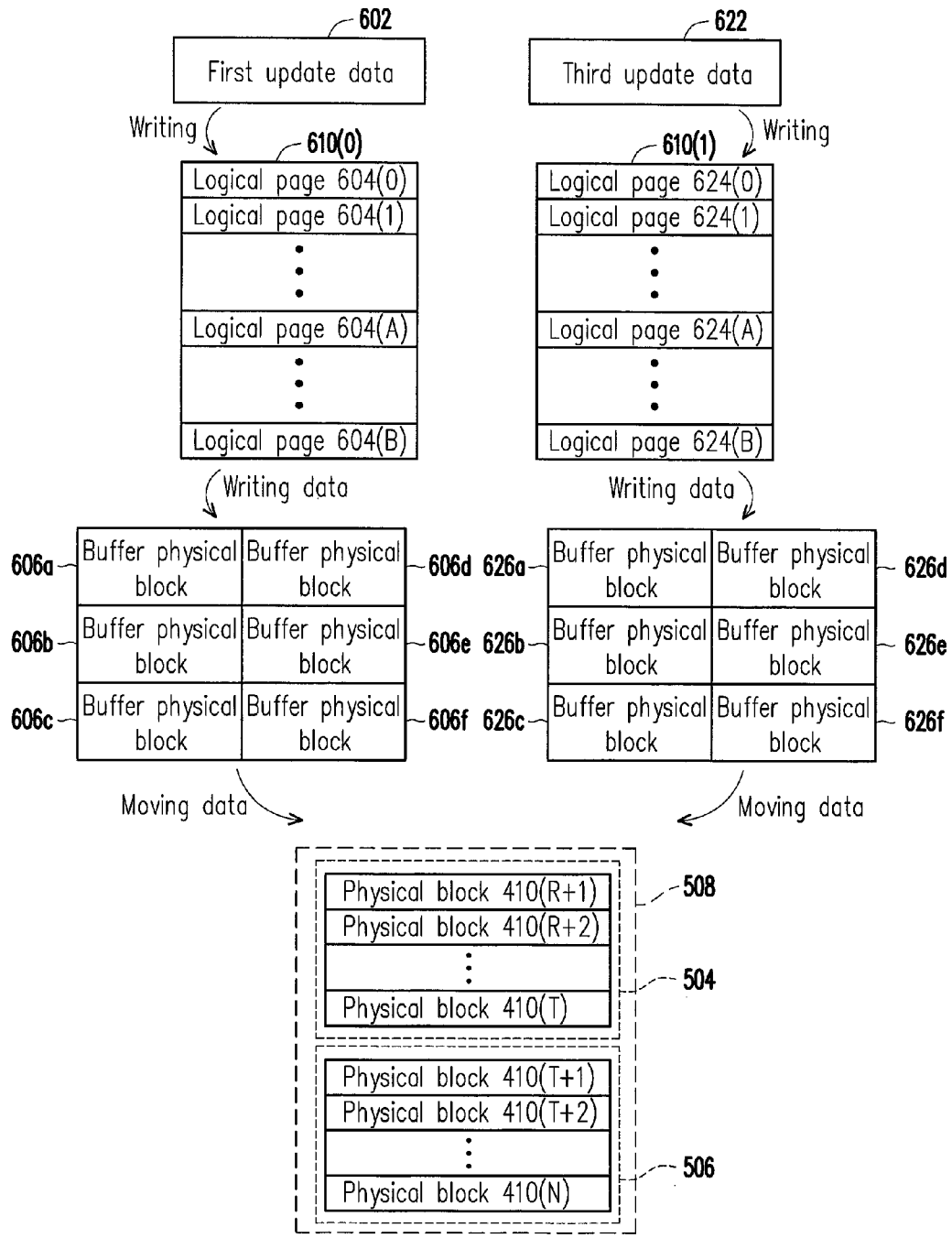
FIG. 7 is a diagram illustrating an example of writing an update data according to another exemplary embodiment.

It should be understood that the first update data 602 and the second update data 640 are to be written into the same logical unit (i.e. the first logical unit 610(0)); however, in another exemplary embodiment, the memory management circuit 302 may receive the update data to be written into more than two different logical units to perform data writing (as shown in FIG. 7).

FIG. 7 is a diagram illustrating an example of writing an update data according to another exemplary embodiment.

Referring to FIG. 7, the memory management circuit 302 receives first update data 602 and third update data 622 from the host system 1000, in which the first update data 602 is to be written into the logical pages 604(0)~604(A) of the logical unit 610(0), and the third update data 622 is to be written into logical pages 624(0)~624(B) of a second logical unit 610(1). However, the present invention is not intent to limit the logical unit where the third update data 622 is to be written and not intent to limit the size and the content of the third update data 622.

In this example, the memory management circuit 302 gets multiple physical blocks form the spare area 504, serves the gotten physical blocks as the buffer physical blocks 606a~606f of the logical unit 610(0) and uses the lower physical pages of the buffer physical blocks 606a~606f to write the first update data 602. In addition, the memory management circuit 302 further gets multiple physical blocks form the spare area 504, serves the gotten physical blocks as the buffer physical blocks 626a~626f of the logical unit 610(1) and uses the lower physical pages of the buffer physical blocks 626a~626f to write the third update data 622.

Specially, afterward, the memory management circuit 302 performs the copy procedure to move the first update data 602 from the buffer physical blocks 606a~606f to the data area 506 and move the third update data 622 from the buffer physical blocks 626a~626f to the data area 506, in a parallel manner. In particular, the first update data 602 and the third update data 622 are to be written into different physical blocks in the data area 506, and thus, when performing the copy procedure, the first update data 602 and third update data 622 may be simultaneously written into different blocks such that the writing speed can be enhanced.

Besides enhancing the writing speed, the structure using the buffer physical blocks as described above can prolong the lifespan of the memory storage device 100. Particularly, when the data to be written by the host system 100 is small-volume data (e.g. the data having a volume smaller than the size of the logical unit) and to be written into the same logical address repeatedly, the memory management circuit 302 merely requires to erase a portion of the buffer physical blocks. For example, when the host system 1000 updates the data in the logical pages 604(0)~604(A) repeatedly, and the logical pages 604(0)~604(A) correspond to the lower physical pages of the buffer physical blocks 606a~606c, the memory management circuit 302 merely requires to erase the buffer physical blocks 606a~606c without erasing the buffer physical blocks 606d~606f so as to avoid shortening the lifespan of the physical blocks from unnecessary erasing operations.

Figure 8:
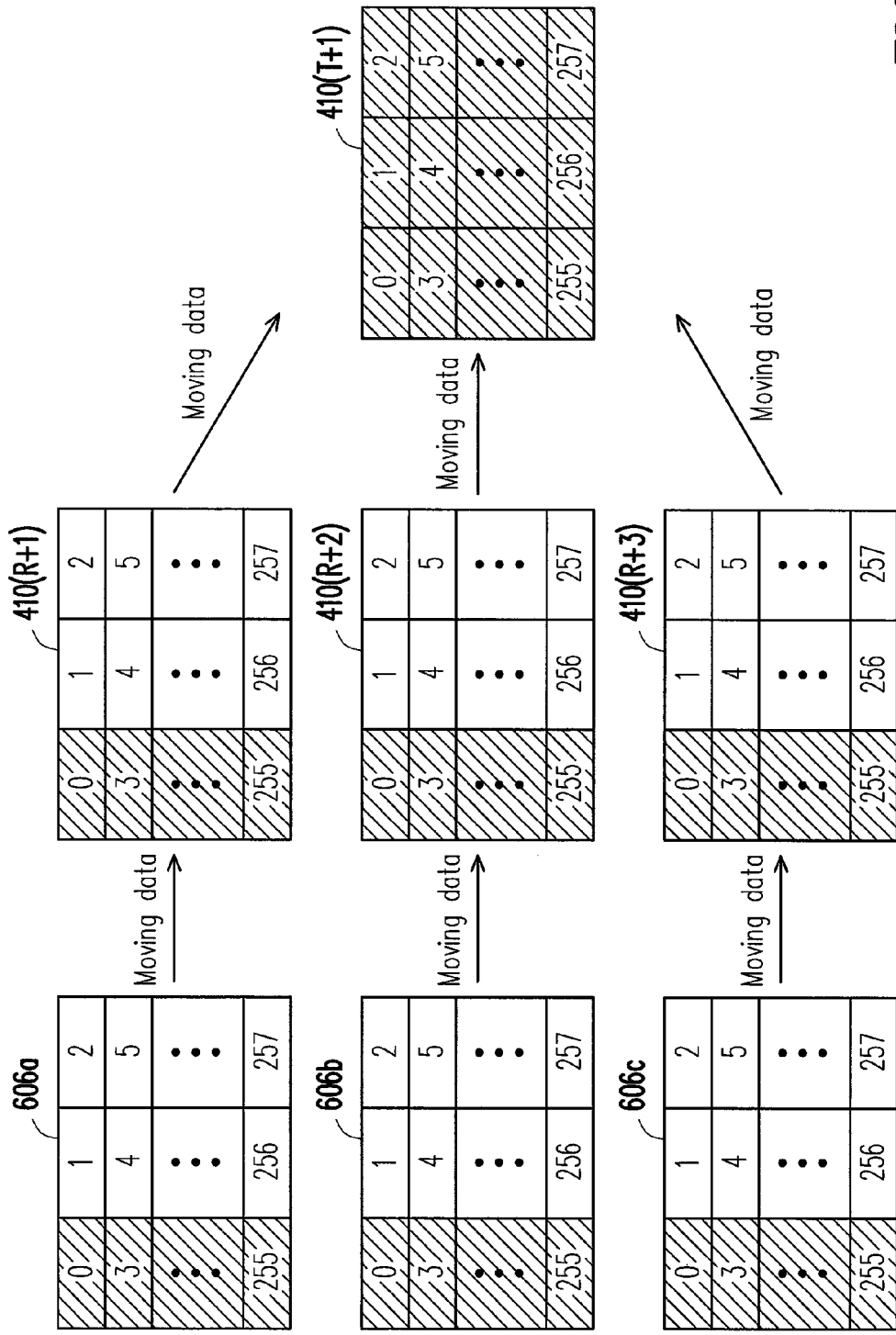
FIG. 8, FIG. 9 and FIG. 10 are schematic diagrams illustrating examples how data corresponding to a first logical unit is moved from buffer physical blocks to a storage area according to the first exemplary embodiment of the present invention.
Figure 9:
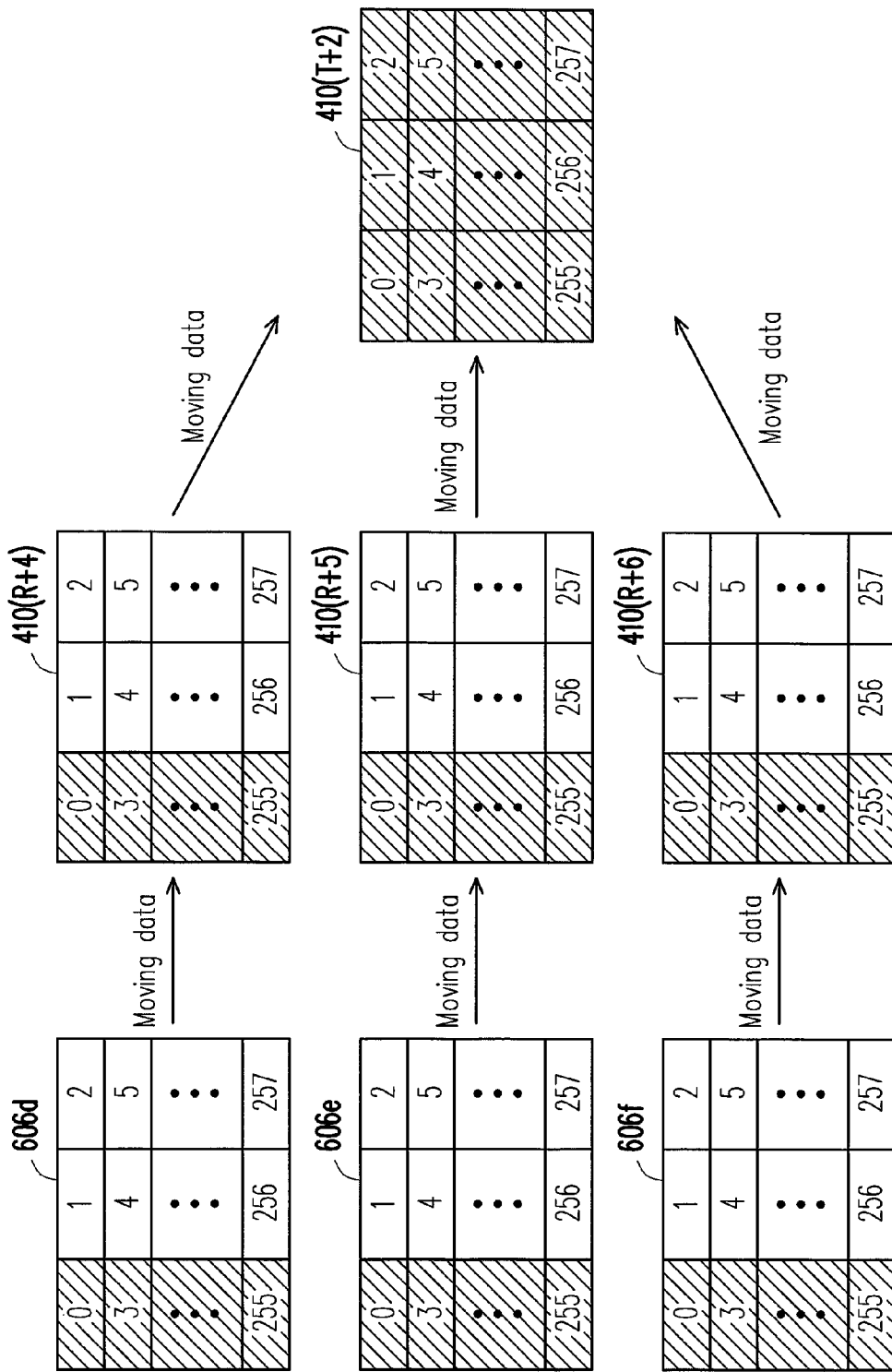
Figure 10:
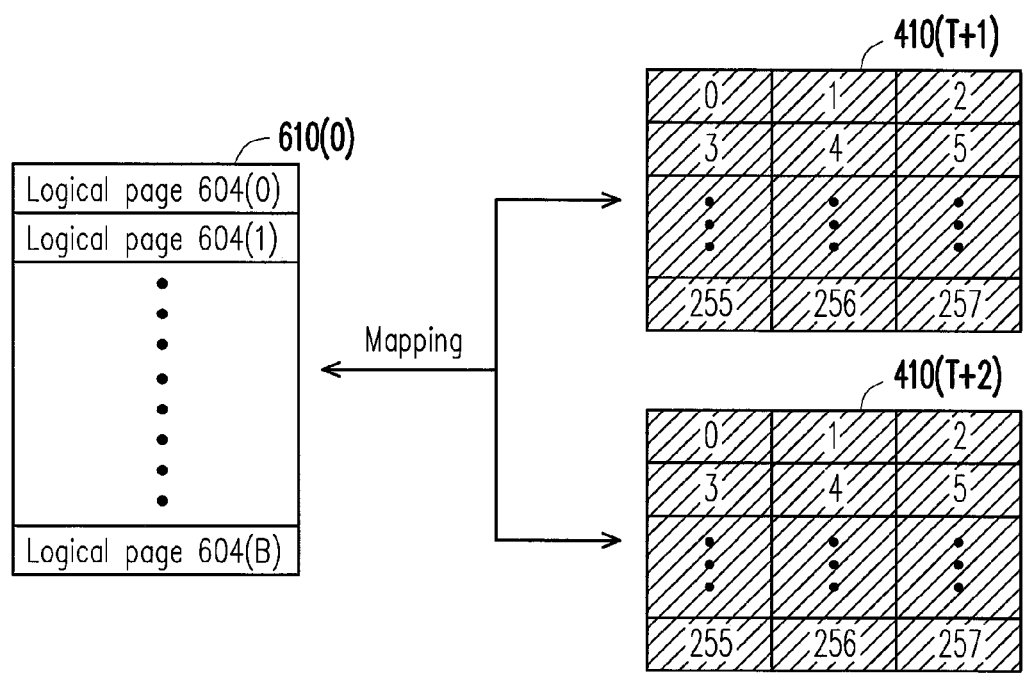

FIG. 8, FIG. 9 and FIG. 10 are schematic diagrams illustrating examples how data corresponding to a first logical unit is moved from buffer physical blocks to a storage area according to the first exemplary embodiment of the present invention.

With reference to FIG. 8, the buffer physical blocks 606a~606c stores a portion of valid data corresponding to the logical unit 610(0). When the buffer physical blocks 606a-606c are to be written into the storage area 508, the memory management circuit 302 gets physical blocks 410(R+1)~410(R+3) and serves the physical blocks 410(R+1)~410(R+3) as temporary physical blocks corresponding to the first logical unit 610(0) to write the first update data 602. Besides, the memory management circuit 302 performs the copy procedure to move the valid data in the buffer physical blocks 606a-606c to the temporary physical blocks 410(R+1)~410(R+3), in which only the lower pages of the temporary physical blocks 410(R+1)~410(R+3) are used to write the valid data belonging to all logical pages of the first logical unit 610(0). For example, the memory management circuit 302 writes the valid data in the buffer physical block 606a into the $0^{th}$, $3^{rd}$ . . . $255^{th}$ pages of the temporary physical block 410(R+1), writes the valid data in the buffer physical block 606b into the $0^{th}$, $3^{rd}$ . . . $255^{th}$ pages of the temporary physical block 410(R+2) and writes the valid data in the buffer physical block 606c into the $0^{th}$, $3^{rd}$ . . . $255^{th}$ pages of the temporary physical block 410(R+3). In other words, since buffer physical blocks 606a~606c correspond to the logical unit 610(0), the memory management circuit 302 performs the copy procedure to move the valid data belonging to all logical pages of the logical unit 610(0) from the spare physical block set to the temporary physical blocks 410(R+1)~410(R+3).

Then, the memory management circuit 302 moves the valid data in the temporary physical blocks 410(R+1)~410(R+3) to the physical blocks in the data area 506. In particular, the memory management circuit 302 selects a blank physical block or a physical block storing invalid data from the data area 506. Specifically, if one gotten physical block is the physical block storing the invalid data, the memory management circuit 302 performs an erasing operation on the physical block in advance. Namely, the invalid data stored in such physical block need to be erased in advance.

For example, the memory management circuit 302 selects one physical block 410(T+1) from the data area 506 and moves the valid data belonging to all logical pages of the first logical unit 610(0) to the lower physical pages (the $0^{th}$, $3^{rd}$, $6^{th}$, . . . , $255^{th}$ physical pages), the middle physical pages (the $1^{st}$, $4^{th}$, $7^{th}$, . . . , $256^{th}$ physical pages) and the upper physical pages (the $2^{nd}$, $5^{th}$, $8^{th}$, . . . , $257^{th}$ physical pages) of the physical block 410(T+1), respectively. Particularly, the memory management circuit 302 moves the valid data from the lower physical pages of a first temporary physical block 410(R+1) to corresponding pages (e.g. the $0^{th}$~$85^{th}$ physical pages) of the physical block 410(T+1). Next, the memory management circuit 302 moves the valid data from the lower pages of a second temporary physical block 410(R+2) to corresponding pages (e.g. the $86^{th}$~$171^{st}$ physical pages) of the physical block 410(T+1). The memory management circuit 302 then moves the valid data from the lower pages of a third temporary physical block 410(R+3) to corresponding pages (e.g. the $172^{nd}$~$257^{th}$ physical pages) of the physical block 410(T+1).

In the present exemplary embodiment, one logical unit corresponds to two physical units, and thus, besides writing a portion of data belonging to the first logical unit 610(0) into the physical block 410(T+1), the memory management circuit 302 further gets another physical block to store another portion of the valid data belonging to the first logical unit 610(0).

Referring to FIG. 9, the buffer physical blocks 606d~606f stores another portion of the valid data belonging to the first logical unit 610(0). In this example, the memory management circuit 302 performs the copy procedure to write the valid data belonging to the buffer physical blocks 606d~606f to the lower physical pages of the temporary physical blocks 410 (R+4)~410(R+6) and moves the valid data in the temporary physical blocks 410(R+4)~410(R+6) to a physical blocks 410(T+2). A method for the memory management circuit 302 to move the buffer physical blocks 606d~606f to the physical block 410(T+2) is similar to that to move the valid data from the buffer physical blocks 606a~606c to the physical block 410(T+1), which will not be repeated hereinafter.

Referring to FIG. 10, after writing the valid data corresponding to the logical unit 610(0) to the physical blocks 410(T+1) and 410(T+2), the memory management circuit 302 re-maps the first logical block 610(0) to the physical block 410(T+1) and 410(T+2) in the logical unit-physical block mapping table and performs the erasing operation on the temporary physical blocks 410(R+1)~410(R+6). In other words, when executing a next write command, the erased physical blocks 410(R+1)~410(R+6) can be re-selected as the temporary physical blocks of the logical unit to be written into.

Figure 11:
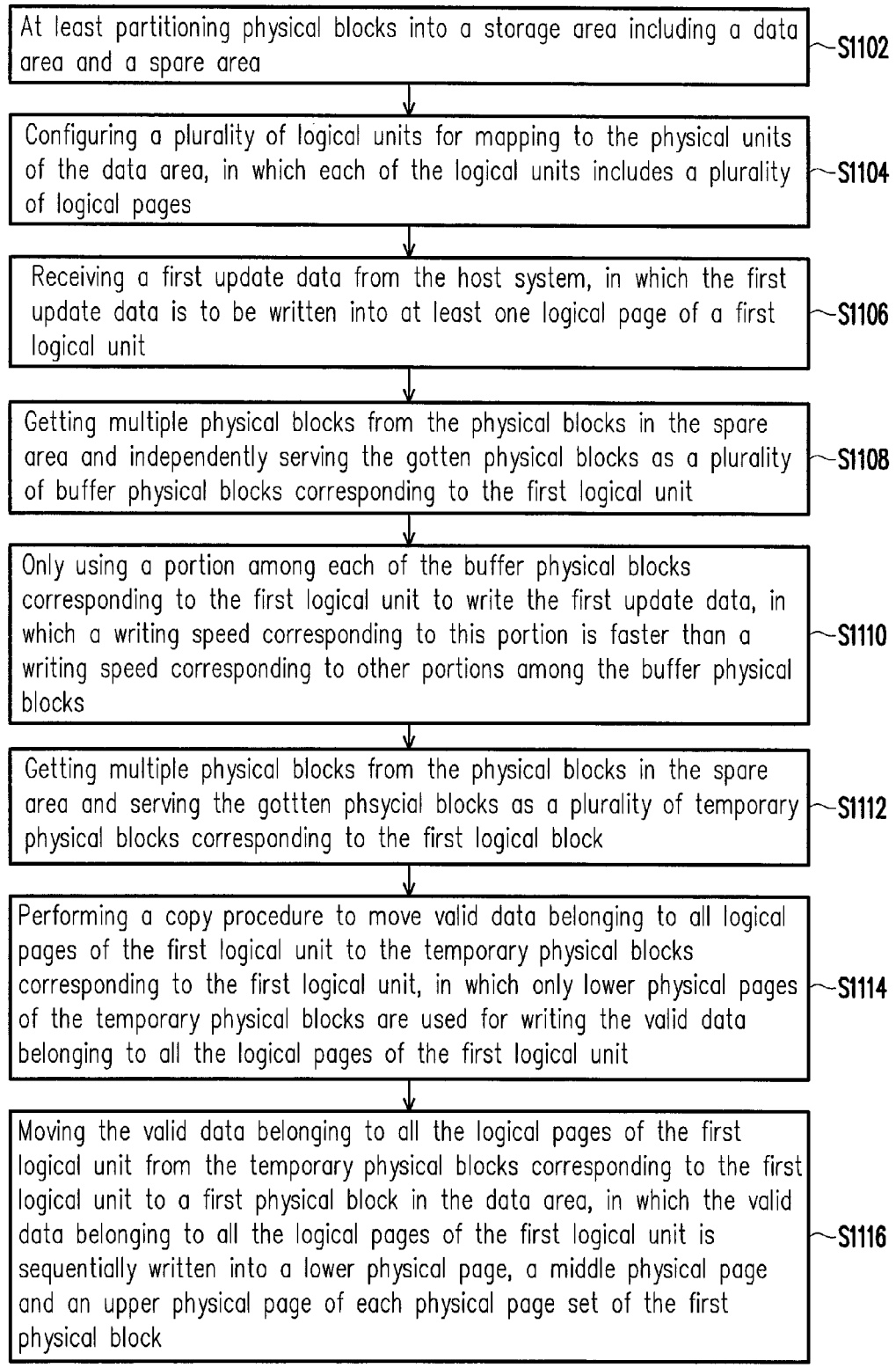
FIG. 11 is a flowchart illustrating a data writing method according to the first exemplary embodiment.

FIG. 11 is a flowchart illustrating a data writing method according to the first exemplary embodiment.

With reference to FIG. 11, in step S1102, the memory management circuit 302 at least partitions physical blocks into a storage area having a data area and a spare area.

In step S1104, the memory management circuit 302 configures a plurality of logical units for mapping to the physical units of the data area, in which each of the logical units includes a plurality of logical pages.

Then, in step S1106, the memory management circuit 302 receives data to be written (hereinafter as first update data) from the host system, in which the first update data is to be written into at least one logical page of a logical unit (hereinafter a first logical unit). Meanwhile, in step S1108, the memory management circuit 302 gets multiple physical blocks from the physical blocks of the spare area and independently serves the gotten physical blocks as a plurality of buffer physical blocks corresponding to the first logical unit.

Then, in step S1110, the memory management circuit 302 only uses a portion of each buffer physical block corresponding to the first logical unit to write the first update data, wherein the writing speed of this portion is faster than the writing speed of the other portion of the buffer physical blocks.

Afterwards, in step S1112, the memory management circuit 302 gets multiple physical blocks from the physical blocks in the spare area and serves the gotten physical blocks as a plurality of temporary physical blocks corresponding to the first logical block. Besides in step S1114, the memory management circuit 302 performs the copy procedure to move valid data belonging to all logical pages of the first logical unit to the temporary physical blocks corresponding to the first logical unit, in which only lower physical pages of the temporary physical blocks are used for writing the valid data belonging to all logical pages of the first logical unit. Then, in step S1116, the memory management circuit 302 moves the valid data belonging to all logical pages of the first logical unit from the temporary physical blocks corresponding to the first logical unit to at least one physical block (hereinafter as a first physical block) in the data area, in which the valid data belonging to all logical pages of the first logical unit is sequentially written into a lower physical page, a middle physical page and an upper physical page of each physical page set of the first physical block.

Second Exemplary Embodiment

The second exemplary embodiment is similar to the first exemplary embodiment, and differs that the rewritable non-volatile memory module of the memory storage device being is a multi level cell (MLC) NAND flash memory module. Namely, each of the physical blocks in the rewritable non-volatile memory module has a plurality of physical page sets, and each of the physical page sets merely has a lower physical page and an upper physical page.

Figure 12:
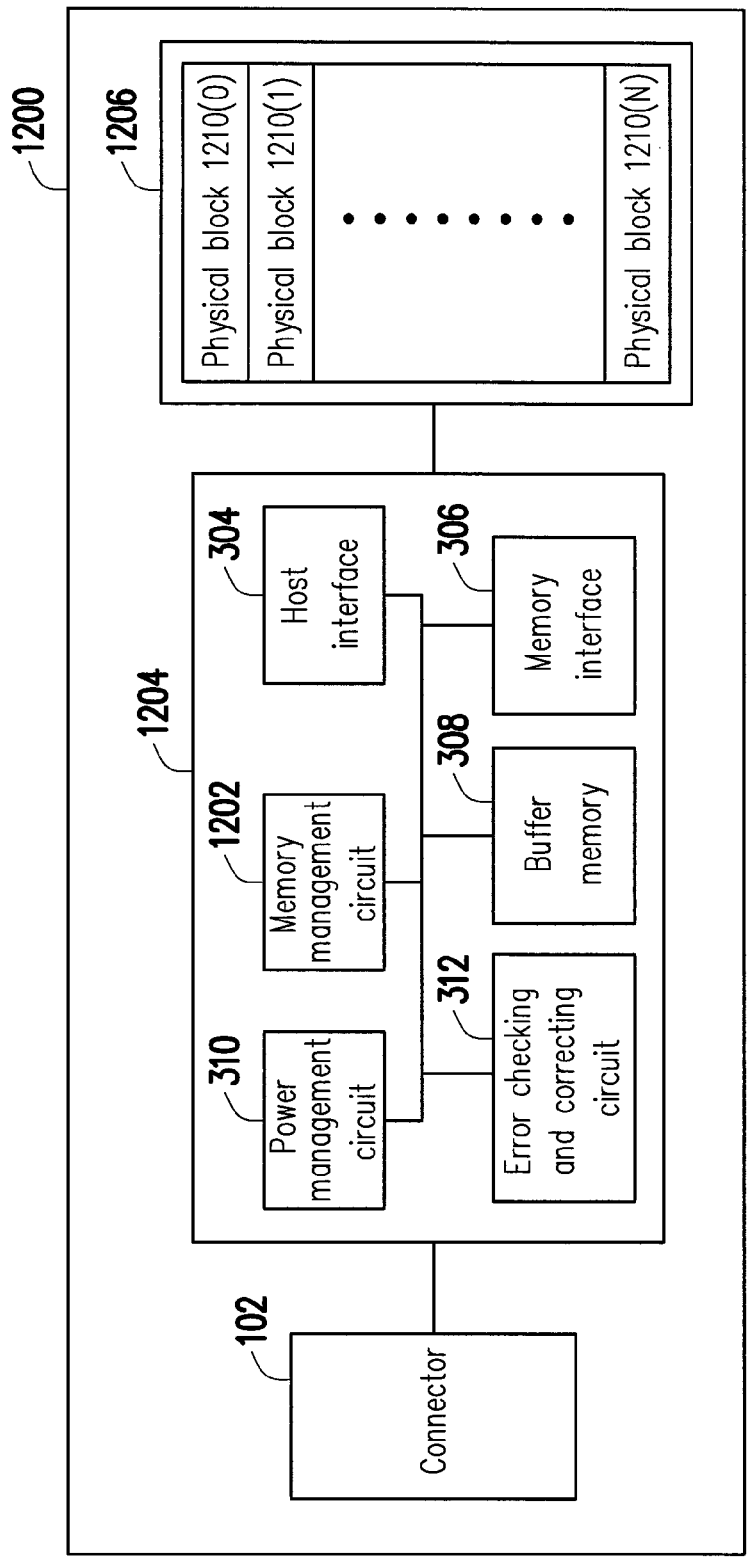
FIG. 12 is a schematic diagram illustrating a memory storage device according to a second exemplary embodiment.

FIG. 12 is a schematic diagram illustrating a memory storage device according to the second exemplary embodiment.

With reference to FIG. 12, a memory storage device 1200 includes the connector 102, a memory controller 1204, and a rewritable non-volatile memory module 1206, in which the function of the connector 102 has been described as above and will not repeated hereinafter.

The memory controller 1204 is configured for executing a plurality of logic gates or control instructions implemented in a form of hardware or firmware and performing various data operations in the rewritable non-volatile memory module 1206 according to commands issued by the host system 1000, such as data writing, reading, erasing, merging, and so on. The memory controller 1204 includes a memory management circuit 1202, the host interface 304, the memory interface 306, the buffer memory 308, the power management circuit 310, and the error checking and correcting (ECC) circuit 312.

The functions of the host interface 304, the memory interface 306, the buffer memory 308, the power management circuit 310, and the error checking and correcting (ECC) circuit 312 have been described as above and will not repeated hereinafter.

The memory management circuit 1202 is configured for controlling the whole operation of the memory controller 1204. Particularly, the memory management circuit 1202 has a plurality of control instructions, and when the memory storage device 1200 is operated, the control instructions are executed to perform a data operation, such as data writing, data reading, data erasing and so on.

In the present exemplary embodiment, the control instructions of the memory management circuit 1202 are implemented in a firmware form. For instance, the memory management circuit 1202 has a microprocessor unit (not shown) and a read-only memory (ROM, not shown), and the control instructions are burned in the ROM. When the memory storage device 1200 is operated, the control instructions are executed by a microprocessor unit to execute operations such as data writing, data reading, and data erasing.

In another exemplary embodiment of the present invention, the control instructions of the memory management circuit 1202 are stored in a specific area (for instance, the system area of the memory module exclusively used for storing system data) of the rewritable non-volatile memory module 1206 in a form of program codes. Moreover, the memory management circuit 1202 includes a microprocessor unit (not shown), a read-only memory (ROM, not shown) and a random access memory (RAM, not shown). In particular, the ROM has a boot code, and when the memory controller 1204 is enabled, the microprocessor unit first executes the boot code to load the control instructions from the rewritable non-volatile memory module 1206 into the RAM of the memory management circuit 1202. The microprocessor unit then executes the control instructions to write, read, and erase data.

Furthermore, in another exemplary embodiment, the control instructions of the memory management circuit 1202 are implemented in a hardware form. For example, the memory management circuit 1202 includes a micro controller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the micro controller. Wherein, the memory cell management circuit is configured for managing the physical blocks of the rewritable non-volatile memory module 1206, the memory writing circuit is configured for giving a write command to the rewritable non-volatile memory module 1206 in order to write data into the rewritable non-volatile memory module 1206, the memory reading circuit is configured for giving a read command to the rewritable non-volatile memory module 106 in order to read data from the rewritable non-volatile memory module 1206, the memory erasing circuit is adopted for giving an erase command to the rewritable non-volatile memory module 106 in order to erase data in the rewritable non-volatile memory module 1206, and the data processing circuit is configured for processing the data to be written into the rewritable non-volatile memory module 1206 or the data read from the rewritable non-volatile memory module 1206.

The rewritable non-volatile memory module 1206 is coupled to the memory controller 1204 and includes physical blocks 1210(0)~1210(N).

In the present exemplary embodiment, the rewritable non-volatile memory module 1206 is an MLC NAND flash memory module. However, it should be understood that the rewritable non-volatile memory module 1206 is not limited to an MLC NAND flash memory module. In another exemplary embodiment of the present invention, the rewritable non-volatile memory module 1206 may also be other flash memory module or other memory module having the same characteristic as the MLC NAND flash memory module.

FIG. 13 is a schematic diagram illustrating an example of physical blocks of a MLC NAND flash memory module according to the second exemplary embodiment.

Referring to FIG. 13, one physical block has a plurality of physical page sets, and each of the physical page sets has a lower physical page and an upper physical page. For example, the $0^{th}$, $2^{nd}$, ..., $254^{th}$ physical pages of the physical block belong to the lower physical pages 2002, and the $1^{st}$, $3^{rd}$, ..., $255^{th}$ physical pages of the physical block belong to the upper physical pages 2006. A speed of writing data into the lower physical pages is faster than that into the upper physical pages. Differing from the first exemplary embodiment, both the lower physical pages and the upper physical pages of the physical blocks in the data area 506 and the spare area 504 are used for storing data. Besides, also differing from the first exemplary embodiment, the physical blocks in the data area 506 and the physical blocks in the spare area 504 physical blocks are alternatively used with each other.

Figure 14:
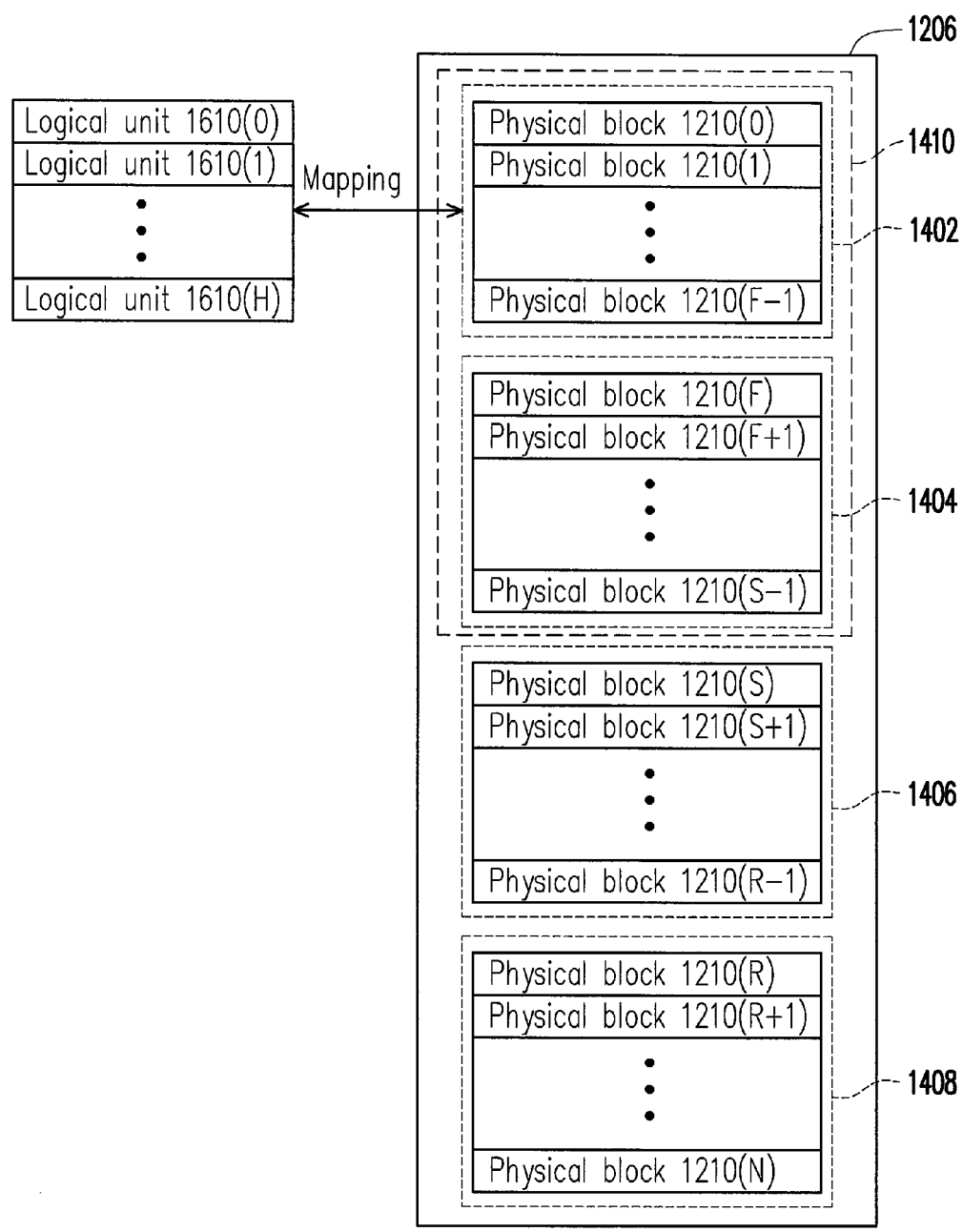
FIG. 14 is a schematic diagram illustrating an example of managing physical blocks of a rewritable non-volatile memory module according to the second exemplary embodiment.

FIG. 14 is a schematic diagram illustrating an example of managing physical blocks of a rewritable non-volatile memory module according to the second exemplary embodiment With reference to FIG. 14, the memory management circuit 1202 of the memory controller 1204 logically groups the physical blocks 1210(0)~1210(N) into multiple areas, such as a storage area 1410 including a data area 1402 and a spare area 1404, a system area 1406, and a replacement area 1408. In another exemplary embodiment, the replacement area 1408 and the spare area 1404 can share the physical blocks containing invalid data.

The physical blocks logically belonging to the storage area 1410 are used for storing data from the host system 1000. To be specific, the physical blocks in the data area 1402 are deemed as the physical blocks used for storing data, and the physical blocks in the spare area 1404 are deemed as the physical blocks used for replacing the physical blocks in the data area 1402. Namely, when a write command and a data to be written are received from the host system 1000, the memory management circuit 1202 gets a physical block from the spare area 1404 and writes the data into the gotten physical block to replace the physical blocks in the data area 1402.

The physical blocks logically belonging to the system area 1406 are configured for recording system data. For instance, the system data includes the manufacturers and models regarding the rewritable non-volatile memory module, the number of physical blocks in the rewritable non-volatile memory modules, the number of physical pages in each physical block, and so on.

The physical blocks logically belonging to the replacement area 1408 are configured for a bad physical block replacement procedure for replacing damaged physical blocks. Particularly, if there are still normal physical blocks in the replacement area 1408, and a physical block in the data area 1402 is damaged, the memory management circuit 1202 gets a normal physical block from the replacement area 1408 to replace the damaged physical block.

The memory management circuit 1202 configures logical blocks 1610(0)~610(H) for mapping the physical blocks in the data area 1402, in which each of the logical blocks has a plurality of logical pages, and the logical pages are sequentially mapped to the physical pages of two physical blocks. For example, the memory management circuit 1202 maintains the logical unit-physical block mapping table for recording the mapping relationship between the logical units 610(0)~610(H) and the physical blocks in the data area 1402. It should to be understood that, in the present exemplary embodiment, one logical unit is mapped to two physical blocks, i.e. the capacity of one logical unit contains the capacity of two physical blocks; however, the present invention is not limited thereto, and in another exemplary embodiment of the present invention, one logical unit may be mapped to one or more physical blocks.

In addition, since the host system 1000 uses a logical access address (e.g. a sector) as an unit for accessing data, when the host system 1000 accesses data, the memory management circuit 1202 converts logical access addresses corresponding to the memory storage device 1200 into corresponding logical pages. For instance, when the host system 1000 is to access a specific logical access address, the memory management circuit 1202 converts the logical access address accessed by the host system 1000 into a multi-dimensional address composed of the corresponding logical block and the corresponding logical page, and accesses data in the corresponding physical page via the logical unit-physical block mapping table.

Figure 15:
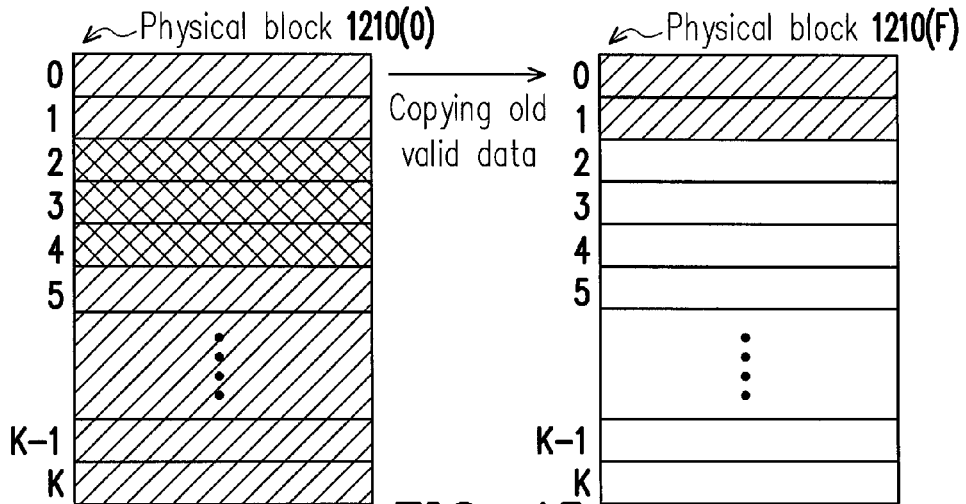
FIG. 15 though FIG. 17 are schematic diagrams illustrating examples of writing data by using child physical blocks according to the second exemplary embodiment.
Figure 17:
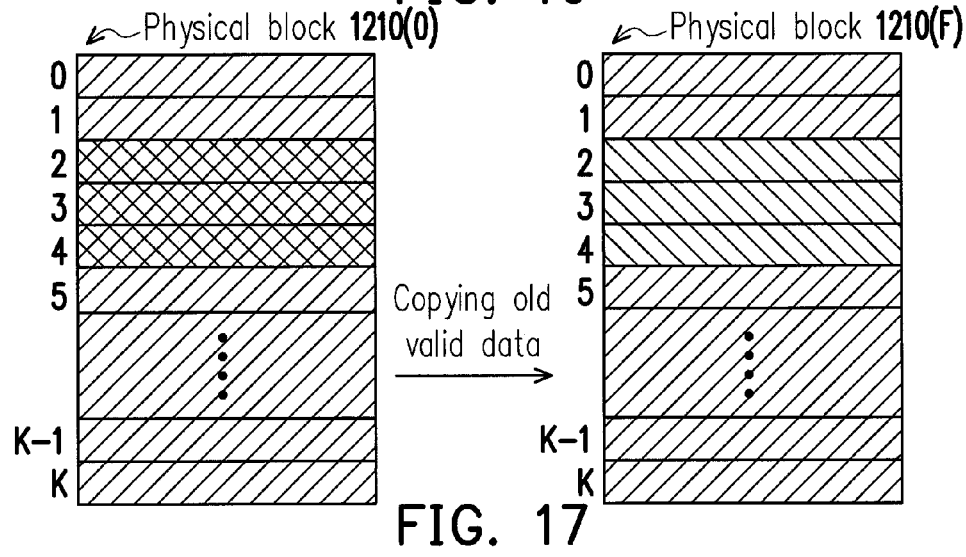

FIG. 15 though FIG. 17 are schematic diagrams illustrating examples of writing data by using child physical blocks according to the second exemplary embodiment.

Figure 16:
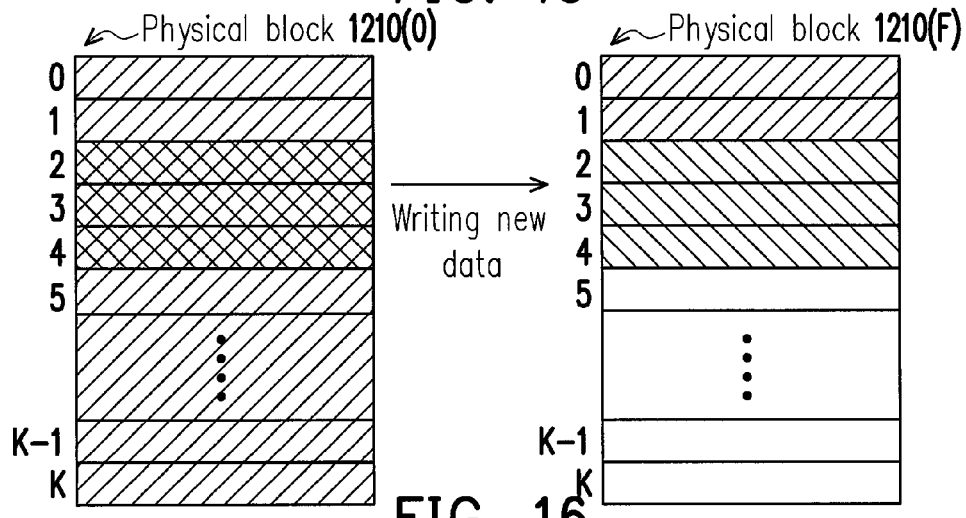

Referring to FIG. 15 through FIG. 17, when receiving a write command from the host system 1000 to write data into the logical unit 1210(0), the memory management circuit 1202 gets one physical block 1210(F) from the spare area 1404 and serves the physical block 1210(F) as one substitute block for alternating with the physical block 1210(0). However, in the meantime when the memory management circuit 1202 writes new data into the physical block 1210(F), the memory management circuit 1202 does not instantly move all valid data in the physical block 1210(0) to the physical block 1210(F) to erase the physical block 1210(0). To be specific, the memory management circuit 1202 copies the old valid data (i.e. the data in the $0^{th}$ physical and the $1^{st}$ physical page in the physical 1210(0)) in the physical block 1210(0) before the physical pages to be written to the $0^{th}$ physical page and the $1^{st}$ physical page in the physical block 1210(F), as shown in FIG. 1210 and writes the new data into the $2^{nd}$~the $4^{th}$ physical pages of the physical block 1210(F) (as shown in FIG. 16). At this time, the memory management circuit 1202 completes the writing operation. Since the valid data in the physical block 1210(0) may become invalid during the next operation (e.g., a write command), instantly moving all the other valid data in the physical block 1210(0) to the physical block 1210(F) may result in meaningless moving operations. Additionally, because data must be written in turn into the physical pages of the physical block, the memory management circuit 1202 only moves the old valid data (i.e. the data in the $0^{th}$ physical and the $1^{st}$ physical page in the physical 1210(0)) before the physical page to be written and does not move other valid data (i.e., the data stored in the $5^{th}$~$K^{th}$ physical pages in the physical block 1210(0)).

In the present exemplary embodiment, the operation of maintaining such a temporary relationship is referred to as opening mother-child blocks. Besides, the original physical block (e.g., the physical block 1210(0)) is referred as a "mother physical block", and the substitute physical block (e.g., the physical block 1210(F)) is referred as a "child physical block". Here, one mother physical block and at least one child physical block corresponding thereto are collectively referred to as a mother-child block set.

Thereafter, when the data in the physical block 1210(0) and the physical block 1210(F) are required to be merged, the memory management circuit 1202 integrates the data in the physical block 1210(0) with the physical block 1210(F) into one single physical block so that the efficiency of using physical blocks can be enhanced. Here, the operation of merging the mother-child blocks is referred to as a data merge operation or as closing mother-child blocks. For instance, as shown in FIG. 17, while closing the mother-child blocks, the memory management circuit 1202 copies the remnant valid data in the physical block 1210(0) (i.e., the data stored in the $5^{th}$~$K^{th}$ physical pages of the physical block 1210(0)) to the $5^{th}$~$K^{th}$ physical pages of the substitute physical block 1210 (F), then performs the erasing operation on the physical block 1210(0), associates the erased physical block 1210(0) to the spare area 1404, and in the meantime, associates the physical block 1210(F) with the data area 1402. Namely, the memory management circuit 1202 re-maps the logical unit 1210(0) originally mapped to the physical unit 1210 (F) to the physical block 1210(F). Thus, differing from the first exemplary embodiment, the physical block 1210(F) originally belonging to the spare area 1404 becomes belonging to the data area 1402 via the aforementioned steps, and the physical block 1210(0) originally belonging to the data area 1402 is associated with the spare area. It should be noted that the number of the physical blocks in the spare area 1404 is limited. Accordingly, during the operation of the memory storage device 100, the number of the opened mother-child block sets is limited as well. Therefore, when the memory storage device 1200 receives the write command from the host system 1000 and the number of the opened mother-child block sets reaches the maximum threshold, the memory management circuit 1202 must close at least one of the opened mother-child block sets so as to execute the write command.

As the same as the first exemplary embodiment, when executing the write command, the memory management circuit 1202 gets physical blocks from the spare area 1404 and uses the same as the buffer physical blocks corresponding to the logical unit where the data is to be written and only uses the lower physical pages of the buffer physical blocks to temporarily store the update data. In the present exemplary embodiment, the capacity of one logical unit is constructed by the capacity of two physical blocks, and thus, the memory management circuit 1202 gets four physical blocks from the spare area 1404 as the buffer physical blocks corresponding to one logical unit.

Figure 18:
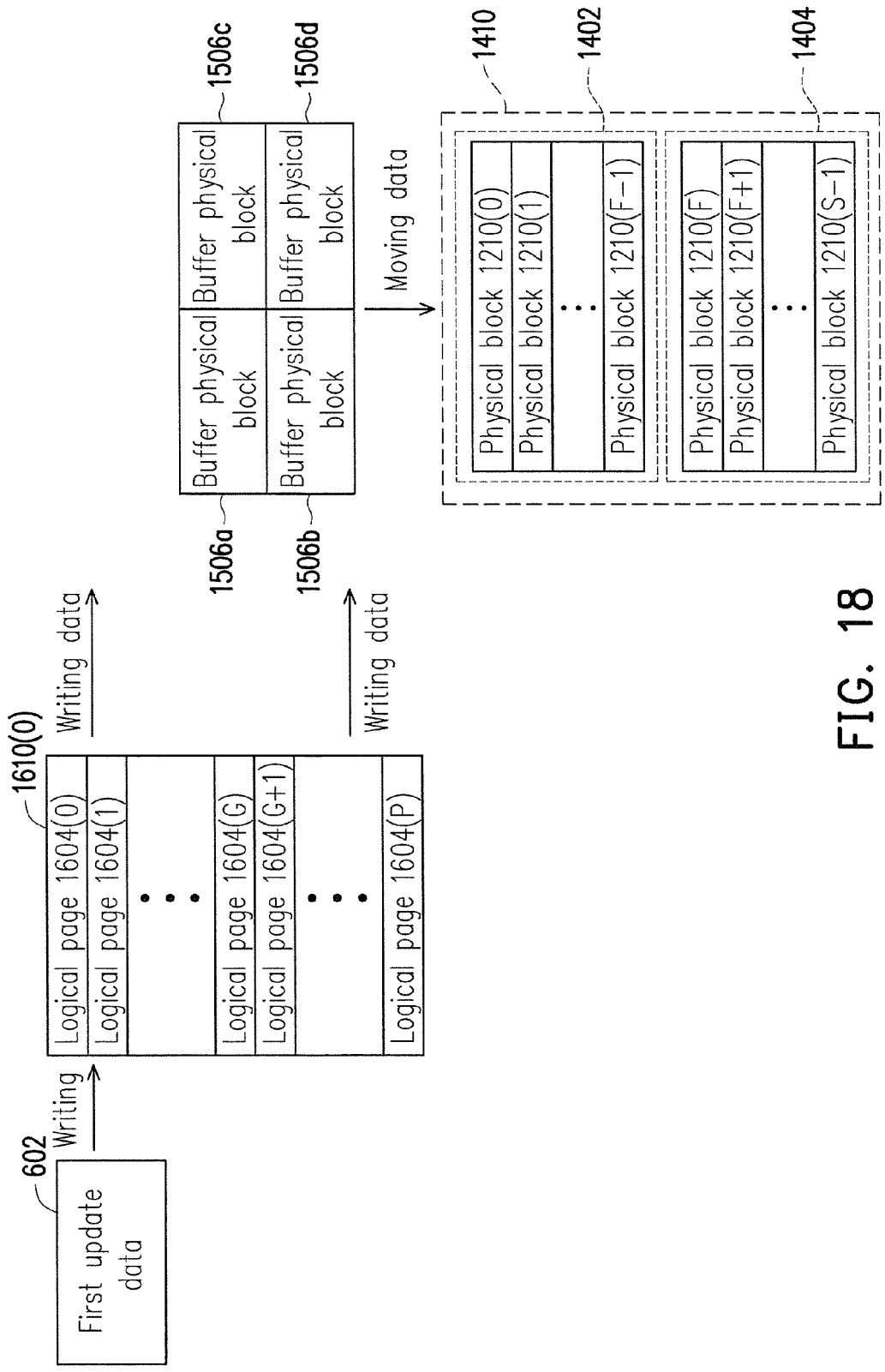
FIG. 18 is a schematic diagram of writing an update data to buffer physical blocks according to the second exemplary embodiment.

FIG. 18 is a flowchart of writing data according to the second exemplary embodiment of the present invention.

With reference of FIG. 18, when the first update data 602 is to be written into at least one of the logical pages 1604(0)~1604(P) of the logical unit 1610(0), the memory management circuit 1202 gets multiple physical blocks from the physical blocks in the spare area 504 and independently serves the gotten physical blocks as the buffer physical blocks 1506a~1506d corresponding to the logical unit 1610(0). The memory management circuit 1202 uses a portion of the buffer physical blocks 1506a~1506d, that data can be written into with a higher writing speed to write the first update data 602. For example, the memory management circuit 1202 uses the lower physical pages of the buffer physical blocks to write the first update data 602, and the writing speed of the lower physical pages is faster than the writing speed of the upper physical pages. Besides, the memory management circuit 1202 then performs the copy procedure to move the first update data 602 from the buffer physical blocks 1506a~1506d to the storage area 1410 so as to finally write the data into the corresponding physical blocks (e.g. the operation as shown in FIG. 15 through FIG. 17). For example, such copy procedure is performed by using a copyback command.

Figure 19:
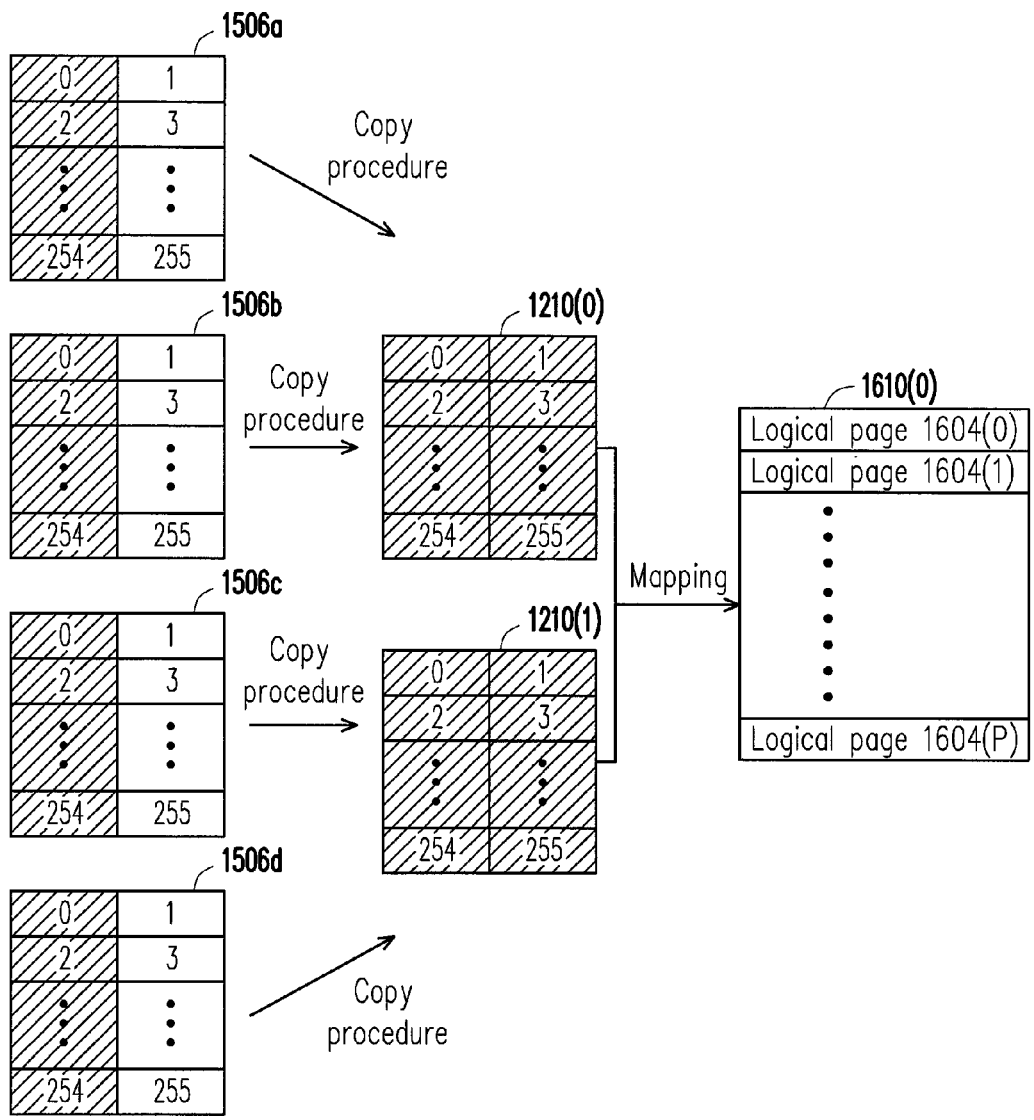
FIG. 19 is a schematic diagram illustrating an example of writing an update data into a storage area according to the second exemplary embodiment.

FIG. 19 is a schematic diagram illustrating an example of writing an update data into a storage area according to the second exemplary embodiment.

Referring to FIG. 19, it is assumed that the lower physical pages of the buffer physical blocks 1506a~1506d store all the valid data belonging to the logical unit 1610(0). At the beginning, the memory management circuit 1202 gets two physical blocks 1210 and 1210(1) from the data area 1402 and performs the copy procedure to sequentially write all the valid data belonging to the logical unit 1610(0) from the lower physical pages of the buffer physical pages 1506a~1506c to the lower physical pages and the upper physical pages of the physical blocks 1210(0) and 1210(1). To be specific, the memory management circuit 1202 moves the valid data in the $0^{th}$, $2^{nd}$, . . . , $254^{th}$ of the buffer physical block 1506a to the $0^{th}$~$127^{th}$ physical pages of the physical block 1210(0), and moves the valid data in the $0^{th}$, $2^{nd}$, . . . , $254^{th}$ of the buffer physical block 1506b to the $128^{th}$~$255^{th}$ physical pages of the physical block 1210(0). On the other hand, the memory management circuit 1202 moves the valid data in the $0^{th}$, $2^{nd}$, . . . , $254^{th}$ of the buffer physical block 1506c to the $0^{th}$~$127^{th}$ physical pages of the physical block 1210(1), and moves the valid data in the $0^{th}$, $2^{nd}$, . . . , $254^{th}$ of the buffer physical block 1506d to the $128^{th}$~$255^{th}$ physical pages of the physical block 410(T+2).

Then, the memory management circuit 1202 re-maps the logical pages 1604(0)~1604(P) of the logical unit 1610(0) to physical pages of the physical block 1210 (0) and the physical block 1210(1). In particular, the memory management circuit 1202 re-maps the logical unit 1610(0) to the physical block 1210 (0) and the physical block 1210(1) in the logical unit-physical block mapping table.

Figure 20:
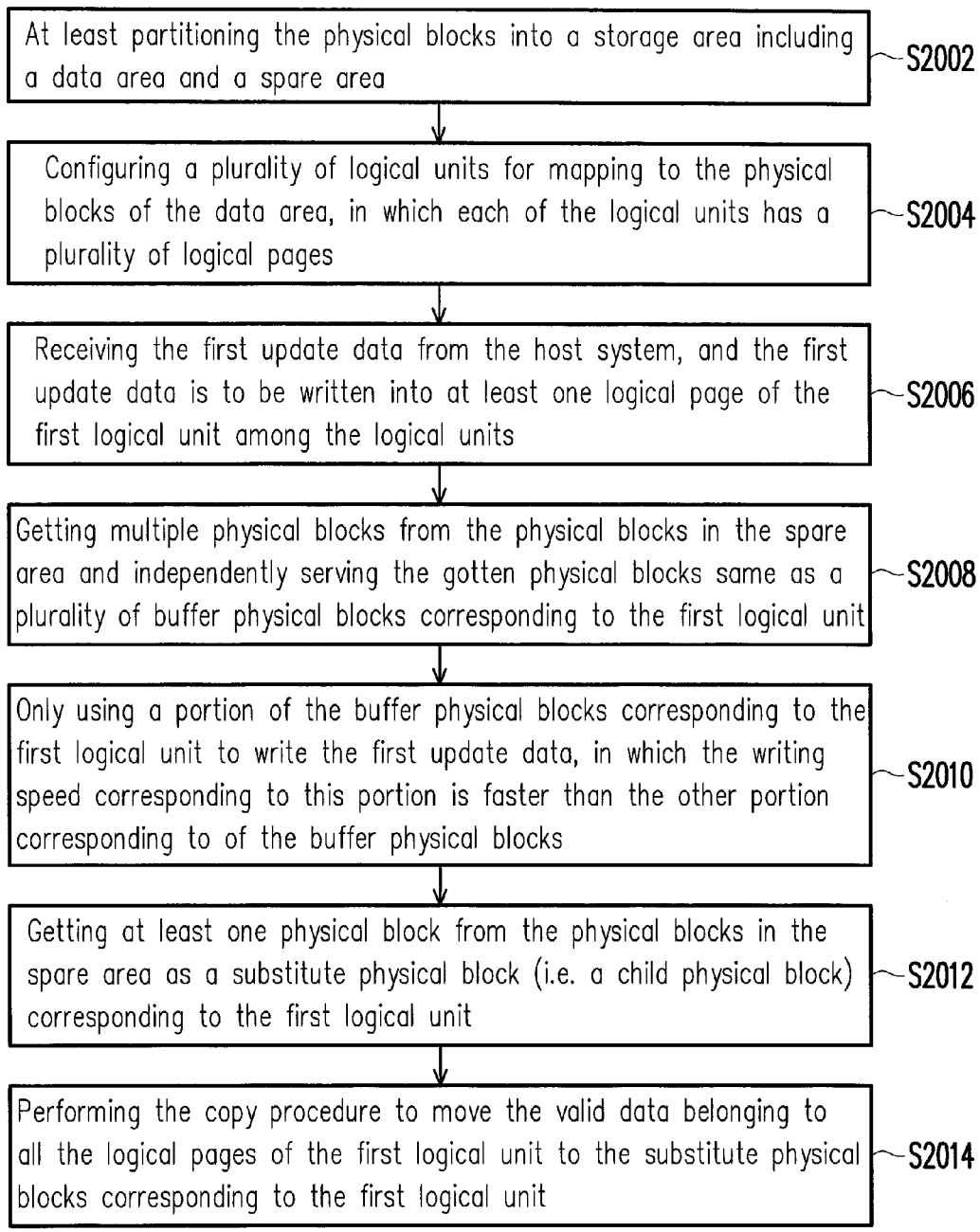
FIG. 20 is a flowchart illustrating a data writing method according to the second exemplary embodiment of the present invention.

FIG. 20 is a flowchart illustrating a data writing method according to the second exemplary embodiment of the present invention.

Referring to FIG. 20, in step S2002, the memory management circuit 1202 at least partitions the physical blocks into a storage area having a data area and a spare area. In step S2004, the memory management circuit 1202 configures a plurality of logical units for being mapped to the physical blocks in the data area, in which each of the logical units has a plurality of logical pages. In step S2006, the memory management circuit 1202 further receives the first update data from the host system 1000, and the first update data is to be written into at least one logical page of the logical units (hereinafter as the first logical unit). In step S2008, the memory management circuit 1202 gets multiple physical blocks from the physical blocks in the spare area and independently serves the gotten physical blocks as a plurality of buffer physical blocks corresponding to the first logical unit. In step S2010, the memory management circuit 1202 only uses a portion of the buffer physical blocks corresponding to the first logical unit to write the first update data, in which the writing speed of this portion is faster than the other portion of the buffer physical blocks. Then, in step S2012, the memory management circuit 1202 gets at least one physical block from the physical blocks in the spare area and serves the gotten physical block as one substitute physical block (i.e. a child physical block) corresponding to the first logical unit. Meanwhile, in step S2014, the memory management circuit 1202 performs the copy procedure to move the valid data belonging to all logical pages of the first logical unit to the substitute physical block corresponding to the first logical unit.

In light of the foregoing, the data writing method, the memory controller and the memory storage device of the exemplary embodiments performs the copy procedure for writing other update data to the storage area in the meantime when receiving the update data to the buffer physical blocks, such that the writing speed is enhanced. Additionally, the data writing method, the memory controller and the memory storage device of the exemplary embodiments writes two different update data respectively into the buffer physical blocks and the two different update data are written from the buffer physical blocks into the storage area in a parallel manner based on the copy procedure such that the writing speed is increased. On the other hand, since only the lower physical pages are used in the buffer physical blocks, according to one exemplary embodiment, the lifespan of the memory storage device can be prolonged. Besides, when multiple physical blocks are deemed as one physical unit for increasing the writing speed, the times for erasing the physical blocks in the present invention can be reduced and thus, the lifespan will not be shortened. The previously described exemplary embodiments of the present invention have the advantages aforementioned, wherein the advantages aforementioned not required in all versions of the present invention.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A data writing method for a memory storage device having a rewritable non-volatile memory module, wherein the rewritable non-volatile memory module has a plurality of physical unit unions, each of the plurality of physical unit unions has a plurality of physical unit sets, each of the plurality of physical unit sets at least has an upper physical unit and a lower physical unit, and a speed of writing data into the plurality of lower physical units is faster than a speed of writing data into the plurality of upper physical units, the data writing method comprising:

partitioning the plurality of physical unit unions into at least a storage area, wherein the storage area has a data area and a spare area;

configuring a plurality of logical units for mapping the plurality of physical unit unions of the data area, wherein each of the logical units has a plurality of logical pages;

receiving first update data from a host system, wherein the first update data is to be written into at least one logical page of a first logical unit among the plurality of logical units;

getting multiple physical unit unions from the physical unit unions of the spare area and independently serving the gotten physical unit unions as a plurality of buffer physical unit unions corresponding to the first logical unit, wherein the plurality of buffer physical unit unions are assigned to only write data belonging to the first logical unit and not being shared;

using only a portion of each of the plurality of buffer physical unit unions corresponding to the first logical unit to write the first update data, wherein a writing speed corresponding to the written portion is faster than a writing speed corresponding to another portion of each of the plurality of buffer physical unit unions; and performing a copy procedure to move the first update data from the plurality of buffer physical unit unions corresponding to the first logical unit to the storage area.

2. The data writing method as recited in claim 1, wherein the step of performing the copy procedure to move the first update data from the plurality of buffer physical unit unions corresponding to the first logical unit to the storage area comprises:

getting at least one physical unit union from the physical unit unions of the spare area and serving the at least one physical unit union as at least one substitute physical unit union corresponding to the first logical unit; and performing the copy procedure to move valid data belonging to all logical pages of the first logical unit to the at least one substitute physical unit union corresponding to the first logical unit, wherein the valid data belonging to all the logical pages of the first logical unit is sequentially written into the lower physical unit and the upper physical unit of each physical unit set of the at least one substitute physical unit union.

3. The data writing method as recited in claim 1, wherein each of the physical unit sets further has a middle physical unit, and the speed of writing data into the lower physical units is faster than a speed of writing data into the middle physical units, wherein the step of performing the copy procedure to move the first update data from the plurality of buffer physical unit unions corresponding to the first logical unit to the storage area comprises:

getting multiple physical unit unions from the physical unit unions of the spare area and serving the gotten physical unit unions as a plurality of temporary physical unit unions corresponding to the first logical unit;

performing the copy procedure to move the valid data belonging to all logical pages of the first logical unit to the plurality of temporary physical unit unions corresponding to the first logical unit, wherein only the lower physical units of the temporary physical unit unions corresponding to the first logical unit is used for writing the valid data belonging to all the logical pages of the first logical unit; and moving the valid data belonging to all the logical pages of the first logical unit from the temporary physical unit unions corresponding to the first logical unit to the at least one first physical unit union among the physical unit unions of the data area, wherein the valid data belonging to all the logical pages of the first logical unit is sequentially written into the lower physical unit, the middle physical unit and the upper physical unit of each physical unit set of the at least one first physical unit union.

4. The data writing method as recited in claim 1 further comprising:

receiving second update data from the host system while performing the copy procedure to move the first update data from the plurality of buffer physical unit unions corresponding to the first logical unit to the storage area.

5. The data writing method as recited in claim 1 further comprising:

receiving third update data from the host system, wherein the third update data is to be written into at least one logical page of a second logical unit among the plurality of logical units;

getting multiple physical unit unions from the physical unit unions of the spare area and independently serving the gotten physical unit unions as a plurality of buffer physical unit unions corresponding to the second logical unit;

using only a portion of each of the buffer physical unit unions corresponding to the second logical unit to write the third update data; and performing the copy procedure to move the third update data from the buffer physical unit unions corresponding to the second logical unit to the storage area.

6. The data writing method as recited in claim 5, wherein the step of performing the copy procedure to move the first update data from the plurality of buffer physical unit unions corresponding to the first logical unit to the storage area and the step of performing the copy procedure to move the third update data from the plurality of buffer physical unit unions corresponding to the second logical unit to the storage area are simultaneously performed in a parallel manner.

7. A memory storage device, comprising:

a rewritable non-volatile memory module having a plurality of physical unit unions, wherein each of the plurality of physical unit unions has a plurality of physical unit sets, each of the plurality of physical unit sets at least has an upper physical unit and a lower physical unit, a speed of writing data into the plurality of lower physical units is faster than a speed of writing data into the plurality of upper physical units;

a connector, configured to be coupled to a host system; and a memory controller, configured to be coupled to the connector and the rewritable non-volatile memory module, wherein the memory controller is configured to partition the plurality of physical unit unions into at least a storage area having a data area and a spare area, wherein the memory controller is further configured to configure a plurality of logical units for mapping to the physical unit unions of the data area, and each of the logical units has a plurality of logical pages, wherein the memory controller is further configured to receive first update data from the host system, and the first update data is to be written into at least one logical page of a first logical unit among the logical units, wherein the memory controller is further configured to get multiple physical unit unions from the physical unit unions of the spare area and independently serve the gotten physical unit unions as a plurality of buffer physical unit unions corresponding to the first logical unit, wherein the plurality of buffer physical unit unions are assigned to only write data belonging to the first logical unit and not being shared, wherein the memory controller is further configured to use only a portion of each of the buffer physical unit unions corresponding to the first logical unit to write the first update data, wherein a writing speed corresponding to the written portion is faster than a writing speed corresponding to another portion of each of the plurality of buffer physical unit unions, and wherein the memory controller is further configured to perform a copy procedure to move the first update data from the plurality of buffer physical unit unions corresponding to the first logical unit to the storage area.

8. The memory storage device as recited in claim 7, wherein the memory controller is further configured to get at least one physical unit union from the physical unit unions of the spare area, serving the uses the at least one physical unit union as at least one substitute physical unit union corresponding to the first logical unit and perform the copy procedure to move valid data belonging to all logical pages of the first logical unit to the at least one substitute physical unit union corresponding to the first logical unit, wherein the valid data belonging to all the logical pages of the first logical unit is sequentially written into the lower physical unit and the upper physical unit of each physical unit set of the at least one substitute physical unit union.

9. The memory storage device as recited in claim 7, wherein each physical unit set further has a middle physical unit, and the speed of writing data into the plurality of lower physical units is faster than a speed of writing data into the middle physical units, wherein the memory controller is further configured to get multiple physical unit unions from the physical unit unions of the spare area, serve the gotten physical unit unions as a plurality of temporary physical unit unions corresponding to the first logical unit and perform the copy procedure to move the valid data belonging to all logical pages of the first logical unit to the temporary physical unit unions corresponding to the first logical unit, wherein only the plurality of lower physical units of the plurality of temporary physical unit unions corresponding to the first logical unit is used for writing the valid data belonging to all the logical pages of the first logical unit, and wherein the memory controller is further configured to move the valid data belonging to all the logical pages of the first logical unit from the temporary physical unit unions corresponding to the first logical unit to at least one first physical unit union among the physical unit unions of the data area, wherein the valid data belonging to all the logical pages of the first logical unit is sequentially written into the lower physical unit, the middle physical unit and the upper physical unit of each physical unit set of the at least one first physical unit union.

10. The memory storage device as recited in claim 7, wherein the memory controller is further configured to receive second update data from the host system while performing the copy procedure to move the first update data from the buffer physical unit unions corresponding to the first logical unit to the storage area.

11. The memory storage device as recited in claim 7, wherein the memory controller is further configured to receive third update data from the host system, wherein the third update data is to be written into at least one logical page of a second logical unit among the logical units, wherein the memory controller is further configured to get multiple physical unit unions from the physical unit unions of the spare area, serve the gotten physical unit unions as a plurality of buffer physical unit unions corresponding to the second logical unit and use only a portion of each of the plurality of buffer physical unit unions corresponding to the second logical unit to write the third update data, and wherein the memory controller is further configured to use the copy procedure to move the third update data from the plurality of buffer physical unit unions corresponding to the second logical unit to the storage area.

12. The memory storage device as recited in claim 7, wherein the memory controller simultaneously performs the copy procedure to move the first update data from the buffer physical unit unions corresponding to the first logical unit to the storage area and to move the third update data from the buffer physical unit unions corresponding to the second logical unit to the storage area.

13. A memory controller for controlling a rewritable non-volatile memory module, wherein the rewritable non-volatile memory module has a plurality of physical unit unions, each of the plurality of physical unit unions has a plurality of physical unit sets, each of the plurality of physical unit sets at least has an upper physical unit and a lower physical unit, and a speed of writing data into the plurality of lower physical units is faster than a speed of writing data into the plurality of upper physical units, the memory controller comprising:

a host interface configured to be coupled to a host system;

a memory interface configured to be coupled to the rewritable non-volatile memory module; and a memory management circuit coupled to the host interface and the memory interface, wherein the memory management circuit is configured to partitioning the plurality of physical unit unions into at least a storage area having a data area and a spare area, wherein the memory management circuit is further configured to configure a plurality of logical units for mapping the physical unit unions of the data area, wherein each of the logical units has a plurality of logical pages, wherein the memory management circuit is further configured to receive first update data from the host system, and the first update data is to be written into at least one logical page of a first logical unit among the logical units, wherein the memory management circuit is further configured to get multiple physical unit unions from the physical unit unions of the spare area and independently serve the gotten physical unit unions as a plurality of buffer physical unit unions corresponding to the first logical unit, wherein the plurality of buffer physical unit unions are assigned to only write data belonging to the first logical unit and not being shared, wherein the memory management circuit is further configured to use only a portion of each of the plurality of buffer physical unit unions corresponding to the first logical unit to write the first update data, wherein a writing speed corresponding to the written portion is faster than a writing speed corresponding to another portion of each of the plurality of buffer physical unit unions, and wherein the management circuit is further configured to perform a copy procedure to move the first update data from the buffer physical unit unions corresponding to the first logical unit to the storage area.

14. The memory controller as recited in claim 13, wherein the memory management circuit is further configured to get at least one physical unit union from the physical unit unions of the spare area, serve the gotten at least one physical unit union as at least one substitute physical unit union corresponding to the first logical unit and perform the copy procedure to move valid data belonging to all logical pages of the first logical unit to the at least one substitute physical unit union corresponding to the first logical unit, and wherein the valid data belonging to all the logical pages of the first logical unit is sequentially written into the lower physical unit and the upper physical unit of each physical unit set of the at least one substitute physical unit union.

15. The memory controller as recited in claim 13, wherein each of the physical unit sets further has a middle physical unit, and the speed of writing data into the lower physical units is faster than a speed of writing data into the middle physical units, wherein the memory management circuit is further configured to get multiple physical unit unions from the physical unit unions of the spare area, serve the gotten physical unit unions as a plurality of temporary physical unit unions corresponding to the first logical unit and perform the copy procedure to move the valid data belonging to all logical pages of the first logical unit to the temporary physical unit unions corresponding to the first logical unit, wherein only the plurality of lower physical units of the plurality of temporary physical unit unions corresponding to the first logical unit is used for writing the valid data belonging to all logical pages of the first logical unit, and wherein the memory management is further configured to move the valid data belonging to all the logical pages of the first logical unit from the temporary physical unit unions corresponding to the first logical unit to at least one first physical unit union among the physical unit unions of the data area, wherein the valid data belonging to all the logical pages of the first logical unit is sequentially written into the lower physical unit, the middle physical unit and the upper physical unit of each physical unit set of the at least one first physical unit union.

16. The memory controller as recited in claim 13, wherein the memory management circuit is further configured to receive second update data from the host system while performing the copy procedure to move the first update data from the plurality of buffer physical unit unions corresponding to the first logical unit to the storage area.

17. The memory controller according to claim 13, wherein the memory management circuit is further configured to receive third update data from the host system, wherein the third update data is to be written into at least one logical page of a second logical unit among the plurality of logical units, wherein the memory management circuit is further configured to get multiple physical unit unions from the physical unit unions of the spare area, independently serve the gotten physical unit unions as a plurality of buffer physical unit unions corresponding to the second physical unit and use only a portion of each of the buffer physical unit unions corresponding to the second physical unit to write the third update data, and wherein the memory management circuit is further configured to perform the copy procedure to move the third update data from the buffer physical unit unions corresponding to the second logical unit to the storage area.

18. The memory controller as recited in claim 17, wherein the memory management circuit simultaneously performs the copy procedure to move the first update data from the plurality of buffer physical unit unions corresponding to the first logical unit to the storage area and to move the third update data from the plurality of buffer physical unit unions corresponding to the second logical unit to the storage area.

* * * * *